United States Patent
Lenges et al.

(10) Patent No.: US 7,632,882 B2
(45) Date of Patent: Dec. 15, 2009

(54) RHEOLOGY CONTROL AGENTS FOR COATING COMPOSITIONS

(75) Inventors: Christian Peter Lenges, Wilmington, DE (US); Yanhui Niu, Newark, DE (US); Yu-Ling Hsiao, Villanova, PA (US); Jiang Ding, Wilmington, DE (US); Robert John Barsotti, Franklinville, NJ (US); Renee J. Kelly, Media, PA (US); Robert James Butera, Havertown, PA (US); Young H. Kim, Hockessin, DE (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 357 days.

(21) Appl. No.: 11/330,933

(22) Filed: Jan. 12, 2006

(65) Prior Publication Data

US 2006/0155020 A1 Jul. 13, 2006

Related U.S. Application Data

(60) Provisional application No. 60/643,514, filed on Jan. 13, 2005.

(51) Int. Cl.
*C08K 5/16* (2006.01)
*C08G 73/00* (2006.01)
(52) U.S. Cl. ...................... 524/186; 528/367
(58) Field of Classification Search ................ 525/453
See application file for complete search history.

(56) References Cited

U.S. PATENT DOCUMENTS

| | | | |
|---|---|---|---|
| 3,585,160 A | 6/1971 | Miller et al. | |
| 3,893,956 A | 7/1975 | Brandt | |
| 4,242,243 A | 12/1980 | Antonelli et al. | |
| 4,311,622 A | 1/1982 | Buter | |
| 4,314,924 A | 2/1982 | Haubennestel et al. | |
| RE31,309 E | 7/1983 | Antonelli et al. | |
| 4,482,664 A * | 11/1984 | Blum et al. ................ | 524/212 |
| 4,508,880 A | 4/1985 | Webster | |
| 4,591,533 A | 5/1986 | Antonelli et al. | |
| 4,659,780 A | 4/1987 | Stamegna et al. | |
| 4,677,028 A | 6/1987 | Heeringa et al. | |
| 4,692,481 A | 9/1987 | Kelly | |
| 4,851,294 A | 7/1989 | Buter et al. | |
| 5,157,069 A * | 10/1992 | Campbell ................ | 524/500 |
| 5,763,528 A | 6/1998 | Barsotti et al. | |
| 6,221,484 B1 | 4/2001 | Leiter | |
| 6,271,340 B1 | 8/2001 | Anderson et al. | |
| 6,420,466 B1 | 7/2002 | Haubennestel et al. | |
| 6,451,950 B1 | 9/2002 | Ma | |
| 6,462,125 B1 | 10/2002 | White et al. | |
| 6,472,463 B1 | 10/2002 | Ma | |
| 6,617,468 B2 | 9/2003 | Haubennestel et al. | |
| 2002/0159961 A1 | 10/2002 | Yamato et al. | |

FOREIGN PATENT DOCUMENTS

| | | |
|---|---|---|
| EP | 0 683 214 | 11/1995 |
| EP | 1 162 242 | 12/2001 |
| GB | 1 454 414 | 11/1976 |
| WO | WO 00/37520 | 6/2000 |
| WO | WO 02/064684 | 8/2002 |
| WO | WO 03/037849 | 5/2003 |
| WO | WO 03/070843 | 8/2003 |
| WO | WO 2004/074413 | 9/2004 |
| WO | WO 2005/005557 | 1/2005 |
| WO | WO 2005/005558 | 1/2005 |

OTHER PUBLICATIONS

L. A. Estroff et al., "Effective Gelation of Water Using a Series of Bis-urea Dicarboxylic Acids" vol. 39, No. 19, 2000 pp. 3447-3450 (XP-001182155).
Search Report for International Application No. PCT/US2006/001632.

* cited by examiner

*Primary Examiner*—Randy Gulakowski
*Assistant Examiner*—Kyle Baumstein
(74) *Attorney, Agent, or Firm*—Brian J Myers

(57) ABSTRACT

The present invention is directed to a rheology control agent for coating compositions. The rheology control agent includes a compound having the Formula (I) including isomers or mixtures of isomers thereof:

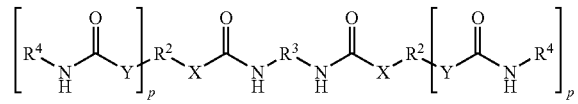

wherein p is 0, 1, 2, or 3; and $R^2$, $R^3$, $R^4$, X and Y groups are described in the specification. The solvent-borne coating compositions containing the rheology control agent have improved rheology control on application and are useful for OEM, refinishing or repainting the exterior of automobile and truck bodies and parts thereof.

11 Claims, No Drawings

RHEOLOGY CONTROL AGENTS FOR COATING COMPOSITIONS

CROSS-REFERENCE TO RELATED APPLICATION

This application claims priority under 35 U.S.C. §119 from U.S. Provisional Application Ser. No. 60/643,514, filed Jan. 13, 2005.

BACKGROUND OF THE INVENTION

This invention relates to rheology control agents for solvent-borne coating compositions useful for finishing the exterior of automobiles and trucks, and in particular to liquid solvent-borne coating compositions having improved rheology to facilitate spray application.

DESCRIPTION OF THE PRIOR ART

The top coat finish of choice currently being used on automobiles and trucks is a clear coat/color coat finish in which a clear coating is applied over the pigmented color coat or base coat to provide protection to the color coat and improve the appearance of the overall finish particularly gloss and DOI (distinctness of image). Mono-coats of pigmented finishes also are used without a clear coat on some automobiles and trucks, in particular, older models. Primers, primer-surfacers and sealers for many automotive and truck applications are applied initially before one of the aforementioned top-coats are applied. All of the above compositions when applied by conventional spraying techniques, have rheology control problems, such as, running and sagging after application. Top-coat finishes containing flake pigments or special effect pigments have problems with flake control and proper flake orientation for optimum appearance.

Additional problems are caused by many localities that have regulations requiring the use of low VOC (volatile organic content) coating compositions to reduce air pollution caused by organic solvent emissions Typically, these low VOC coating compositions have a VOC of 2.1 pounds/gallon (252 g/l) or less and when applied by conventional spray techniques often have problems with running and sagging of the finish after application and also problems with proper flake orientation and control.

These low VOC coating compositions typically are used for OEM (original equipment manufacture) of automobiles, trucks and parts thereof and for refinishing or repainting of automobiles and trucks or parts thereof and are usually formulated using relatively low molecular weight polymers. However, as pointed out above, such compositions generally have poor rheology control and run and sag after spray application particularly when applied to vertical surfaces, such as, door panels and body side panels and have poor control of flake orientation. A rheology control agent is needed to improve the rheology control of these coating compositions to prevent runs and sags after application and in general to provide a finish with an acceptable appearance with good gloss and DOI.

Rheology control is also very critical for the low solids lacquer basecoats typically used in the refinishing or repainting of automobiles and trucks. These lacquer basecoats are typically applied at very low solids, as low as 10% by volume, using spray application. To achieve adequate hiding in these coatings, a dry film thickness of around 15 to 65 microns is typically required. Because of the very low volume solids of these coatings, the applied wet film thickness of these coatings can be around 350 microns or more. This requires the use of a very effective rheology control agent to prevent sagging and to give good flake orientation. Another aspect of these lacquer coatings, is that they typically contain higher molecular weight binder components which can be incompatible with many conventional rheology control agents.

Rheology control agents are shown in U.S. Pat. No. 3,893,956, U.S. Pat. No. 4,311,622, U.S. Pat. No. 4,314,924, U.S. Pat. No. 4,677,028, U.S. Pat. No. 4,851,294, U.S. Pat. No. 6,420,466 B1, U.S. Pat. No. 6,617,468 B2, and EP 0683214, EP 1162242, DE 10241853B3, and WO 03/037849. These rheology control agents of the prior art in general cannot be formulated into high solids compositions and do not provide the necessary level of optical clarity to the resulting finishes and form finishes having low DOI levels, particularly when the coating compositions are ambient temperature curing compositions. Some of these rheology control agents have to be prepared in the presence of the binder of the coating composition to achieve the desired level of rheological control, which adds to the manufacturing costs of the composition by requiring additional manufacturing steps and the use of specific and also expensive equipment. Also, some rheology control agents, for example, taught by U.S. Pat. No. 6,617,468 B2 limit the weatherability of the resulting finish, which over time, negatively impacts the appearance of the finish. Some rheology control agents, for example, taught by U.S. Pat. No. 4,311,622 are limited in their compatibility with the resin system. Furthermore, some rheology control agents, for example, taught by U.S. Pat. No. 4,311,622 or WO 02/064684 show insufficient compatibility in the resin system of choice especially rheology control agents prepared using hydroxy functional monoamines.

U.S. Patent Publication 2002/0159961, published Oct. 31, 2002 shows gelling agents that are used to gel oils and in cosmetic compositions, such as, antiperspirants but have not been suggested for use in coating compositions.

Accordingly, there is still a need for coating compositions for a wide variety of application that contain a rheology control agent that will provide an acceptable level of rheology control on application of the composition without deteriorating the appearance, durability or weatherability of both high solids and low solids coating compositions that are often used in OEM automotive and truck manufacturing and to refinish or repaint automobile and truck bodies or parts thereof.

SUMMARY OF THE INVENTION

The present invention provides for a rheology control agent and the use of the agent in coating compositions to improve rheology control of both low and high solids solvent-borne coating compositions that are useful in OEM painting or refinishing or repainting the exterior of automobile and truck bodies and parts thereof.

The rheology control agent of this invention comprises a compound described by Formula (I) or (II) including isomers or mixtures of isomers thereof:

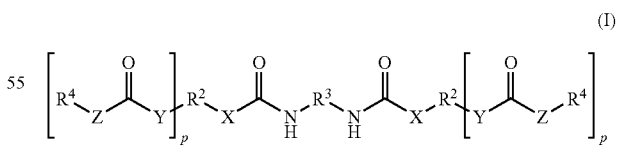

(I)

wherein
p is 0, 1, 2, or 3;
wherein
R⁴ independently is a C4 to C16 linear or branched alkyl group; a C5 to C12 cycloaliphatic group; a C6 to C16 cycloaliphatic group bearing a linear or branched C1 to C8 alkyl group; a $(-CH_2CH_2-O)_n-CH_3$ group with n being independently 1 to 8;

wherein
if p is 0, $R^2$ is a C3 to C16 linear or branched alkyl group, a C1 to C6 linear or branched alkyl group bearing a C5-C16 cycloaliphatic group, a C5-C16 cycloaliphatic or alkyl substituted cycloaliphatic group; and $R^3$ is a C4 to C12 branched alkylene group; a —$(CH_2)_w$OC(O)—$(CH_2)_s$C(O)O$(CH_2)_t$— group with w and t equal to 1, 2, or 3 and s equal to 1 to 12; a —$CHR^6C(O)O—R^8$—OC(O)$CHR^7$— group with $R^8$ equal to a C3 to C16 linear or branched alkylene group, a C1 to C6 linear or branched alkylene group bearing a C5-C16 cycloaliphatic group, a C5-C16 cycloaliphatic or alkyl substituted cycloaliphatic group, a (—$CH_2CH_2$—O—$CH_2CH_2$—)$_m$ group with m being 1 to 4, and with $R^6$ and $R^7$ independently equal to a methyl, isopropyl, benzyl, or isobutyl group and X is NH;

wherein
if p is 1, $R^2$ is a C1 to C8 linear or branched alkylene group, a —$(CH_2CH_2$—O)$_n$—$CH_2CH_2$— group with n being 1 to 4, wherein
if p is 2, $R^2$ is Formula (IIIa) and if p is 3, $R^2$ is Formula (IIIb)

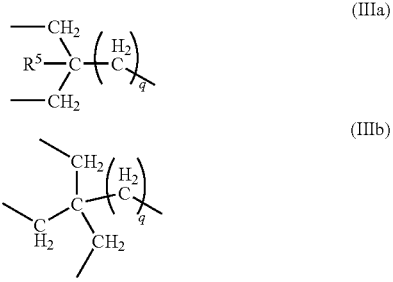

wherein
q is 0 or 1; and $R^5$ is H, a C1 to C5 linear alkyl group;

wherein
if p is 1, 2, or 3, $R^3$ is a C3 to C16 linear or branched alkylene group, a C1 to C6 linear or branched alkylene group bearing a C5-C16 cycloaliphatic group, a C5-C16 cycloaliphatic or alkyl substituted cycloaliphatic group; $R^4$ is as described above;

wherein
if p is 1, 2, or 3, X and Y are chosen from O or NH with the proviso that if X is O, Y cannot be O and if X is NH, Y cannot be NH, Y may also be nothing, Z is chosen from O, NH, or nothing; or formula (II)

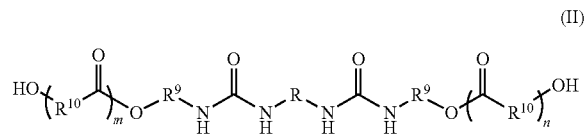

wherein
R is a C3 to C16 linear or branched alkylene group, a C1 to C6 linear or branched alkylene group bearing a C5-C16 cycloaliphatic group, a C5-C16 cycloaliphatic or alkyl substituted cycloaliphatic group, $R^9$ is a C1 to C8 linear or branched alkylene group, a —$(CH_2CH_2$—O)$_n$—$CH_2CH_2$— group with n being 1 to 4, and $R^{10}$ is a C3 to C16 linear or branched, alkylene group linkage;

wherein
n=1-7, m=1-7.

Solvent-borne paint compositions containing the above rheology control agents and a substrate having adhered thereto a layer of the coating a composition containing the above rheology control agent also are part of this invention.

DETAILED DESCRIPTION OF THE INVENTION

The features and advantages of the present invention will be more readily understood, by those of ordinary skill in the art, from reading the following detailed description. It is to be appreciated those certain features of the invention, which are, for clarity, described above and below in the context of separate embodiments, may also be provided in combination in a single embodiment. Conversely, various features of the invention that are, for brevity, described in the context of a single embodiment, may also be provided separately or in any sub-combination. In addition, references in the singular may also include the plural (for example, "a" and "an" may refer to one, or one or more) unless the context specifically states otherwise.

The use of numerical values in the various ranges specified in this application, unless expressly indicated otherwise, are stated as approximations as though the minimum and maximum values within the stated ranges were both proceeded by the word "about." In this manner, slight variations above and below the stated ranges can be used to achieve substantially the same results as values within the ranges. Also, the disclosure of these ranges is intended as a continuous range including every value between the minimum and maximum values.

All patents, patent applications and publications referred to herein are incorporated by reference in their entirety.

The rheology control agents of this invention are typically used in solvent-borne coating compositions, particularly clear and pigmented solvent-borne paint compositions used for OEM painting or for refinishing or repainting the exterior of automobiles and trucks and parts thereof. The rheology control agent improves the rheology of the coating compositions to facilitate spray applications and provide a Class A automotive finish having an excellent overall appearance, good DOI and flows out but does not sag or run particularly when spray applied to vertical surfaces. Also, the rheology control agents provide for the proper orientation of flake or special effects pigments when used in base coats or mono coats and improves flake and pigment anti settling properties of coating compositions. The rheology control agents also can be used in primers, primer surfacers and primer fillers.

A compound which can provide rheology control to a coating composition must be compatible with the coating composition and not deteriorate the properties of the resulting finish, such as, gloss and DOI or the weatherability or durability of the finish. Small changes in the chemical composition of a compound can significantly affect its use as a rheology control agent. Rheological measurements are useful in characterizing the effectiveness of a rheology control agent, but the final measure of the ability of a compound to provide effective rheology control in a coating composition, is to test the compound in a coating composition using conventional application conditions such as spray application, optionally, with subsequent drying or baking of the resulting finish and observe the resulting appearance of the finish.

Typically, solvent-borne coating compositions comprise 5 to 95 percent by weight solvent, based on the weight of the coating composition, and 5 to 95 percent by weight of binder, which includes the rheology control agent. Typically, the level of rheology control agent in such compositions is in the range of 0.1 to 30 percent by weight, based on the weight of the binder, and preferably, 0.1 to 10 percent by weight based on the weight of the binder.

The rheology control agents also can be used in 100% binder solids compositions in the ranges shown above.

The term "binder" as used herein refers to the film forming constituents of the composition and includes any crosslinking components, such as, polyisocyanates, optional polymeric and/or oligomeric components, and optional reactive diluents. Solvents, pigments, catalysts, antioxidants, U.V. absorbers, light stabilizers, leveling agents, antifoaming agents, anti-cratering agents, adhesion promoting agents are not included in the term.

Molecular weight (both number and weight average) is determined by gel permeation chromatography utilizing a high performance liquid chromatograph supplied by Hewlett-Packard, Palo Alto, Calif. and unless otherwise stated the liquid phase used was tetrahydrofuran and the standard was polymethylmethacrylate or polystyrene.

"Tg" (glass transition temperature) is in ° C. and determined by Differential Scanning Calorimetry or calculated according to the Fox Equation.

"Lacquer" is a coating composition which dries via solvent evaporation without any substantial crosslinking of the binder of the coating composition.

The rheology control agent of this invention useful in the aforementioned coating compositions as a rheology control agent comprises at least one of the following compositions or mixtures thereof represented by the following formula:

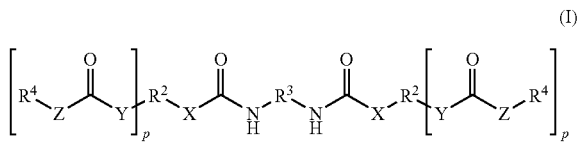
(I)

wherein
  p is 0, 1, 2, or 3;

wherein
  $R^4$ independently is a C4 to C16 linear or branched alkyl group; a C5 to C12 cycloaliphatic group; a C6 to C16 cycloaliphatic group bearing a linear or branched C1 to C8 alkyl group; a $-CH_2CH_2-O)_n-CH_3$ group with n being independently 1 to 8;

wherein
  if p is 0, $R^2$ is a C3 to C16 linear or branched alkyl group, a C1 to C6 linear or branched alkyl group bearing a C5-C16 cycloaliphatic group, a C5-C16 cycloaliphatic or alkyl substituted cycloaliphatic group; $R^3$ is a C4 to C12 branched alkylene group; a $-(CH_2)_w OC(O)-(CH_2)_s C(O)O(CH_2)_t-$ group with w and t equal to 1, 2, or 3 and s equal to 1 to 12; a $-CHR^6C(O)O-R^8-OC(O)CHR^7-$ group with $R^8$ equal to a C3 to C16 linear or branched alkylene group, a C1 to C6 linear or branched alkylene group bearing a C5-C16 cycloaliphatic group, a C5-C16 cycloaliphatic or alkyl substituted cycloaliphatic group, a $(-CH_2CH_2-O-CH_2CH_2-)_m$, group with m being 1 to 4, and with $R^6$ and $R^7$ independently equal to a methyl, isopropyl, benzyl, or isobutyl group and X is NH;

wherein
  if p is 1, $R^2$ is a C1 to C8 linear or branched alkylene group, a $(-CH_2CH_2-O)_n-CH_2CH_2-$ group with n being 1 to 4, wherein
  if p is 2, $R^2$ is Formula (IIIa) and if p is 3, $R^2$ is Formula (IIIb)

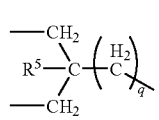
(IIIa)

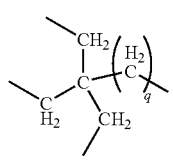
(IIIb)

wherein
  q is 0 or 1; and $R^5$ is H or a C1 to C5 linear alkyl group;

wherein
  if p is 1, 2, 3, $R^3$ is a C3 to C16 linear or branched alkylene group, a C1 to C6 linear or branched alkylene group bearing a C5-C16 cycloaliphatic group, a C5-C16 cycloaliphatic or alkyl substituted cycloaliphatic group; and $R^4$ is as defined above;

wherein
  if p is 1, 2, 3× and Y are chosen from O or NH with the proviso that if X is O, Y cannot be O and if X is NH, Y cannot be NH, Y may also be nothing, Z is chosen from O, NH, or nothing; or formula (II)

$$HO \left( R^{10} \right)_m O-R^9-N(H)-N(H)-R-N(H)-N(H)-R^9-O \left( R^{10} \right)_n OH$$
(II)

wherein R is a C3 to C16 linear or branched alkylene group, a C1 to C6 linear or branched alkylene group bearing a C5-C16 cycloaliphatic group, a C5-C16 cycloaliphatic or alkyl substituted cycloaliphatic group, $R^9$ is a C1 to C8 linear or branched alkylene group, a $-(CH_2CH_2-O)_n-CH_2CH_2-$ group with n being 1 to 4, and $R^{10}$ is a C3 to C16 linear or branched, alkylene group linkage;
  wherein n=1-7, m=1-7.

The following formulas illustrate particularly useful rheology control agents of this invention that provide solvent-borne coatings or 100% solids coatings with excellent rheology control and form finishes that have excellent overall appearance, good DOI, do not sag or run on application and good metal flake orientation. Further, these rheology control agents can be used in conjunction with a wide variety of coating compositions containing as the binder, polyacrylates, polymethacrylates, branched, grafted or segmented poly (meth)acrylates, acrylic alkyd resins, polyesters, branched polyesters, oligomers, polyesterurethanes. These coating compositions may also utilize crosslinking agents, such as, polyisocyanates, alkylated melamines, melamine derivatives, and epoxides. These coating compositions may contain pigments and/or metal flakes.

Preferred rheology control agents in the first embodiment are for example structures (IV) to (XVI). These structures are defined by formula (I) with p equal to 1, X equal to NH, Y equal to O and Z equal to NH, with $R^2$-$R^4$ as defined above.

The rheology control agents (IV) to (XVI) are prepared by first reacting an amino alcohol component with a diisocyanate component. The reaction temperature, conditions and reactant concentration are selected to favor the formation of the intermediate addition product, a bis-urea diol derivative. Further reaction with a mono-isocyanate component forms the rheology control agent of this invention.

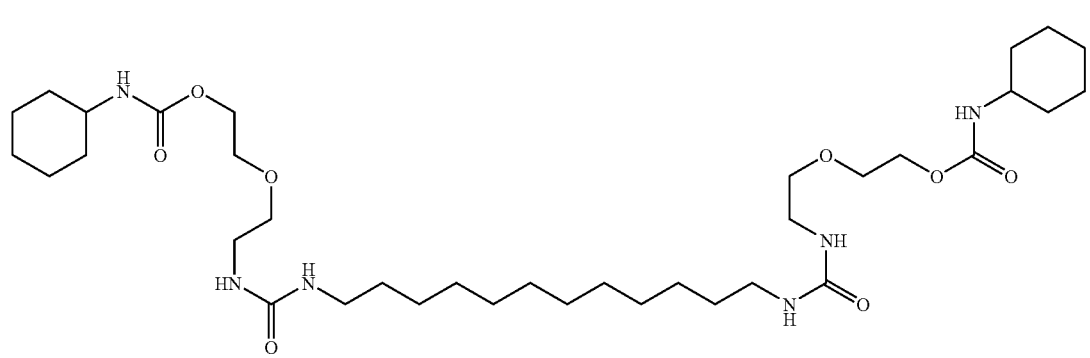
(IV)
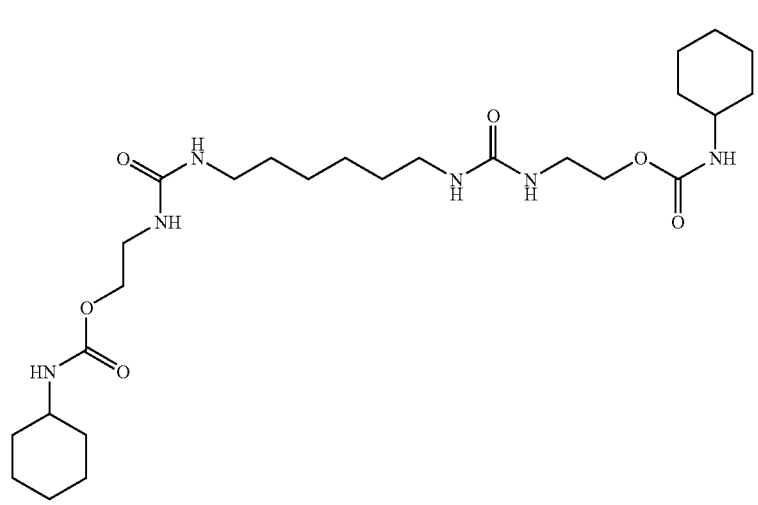
(V)
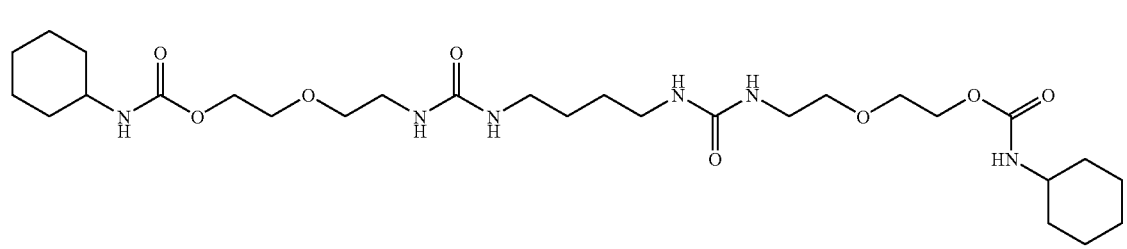
(VI)
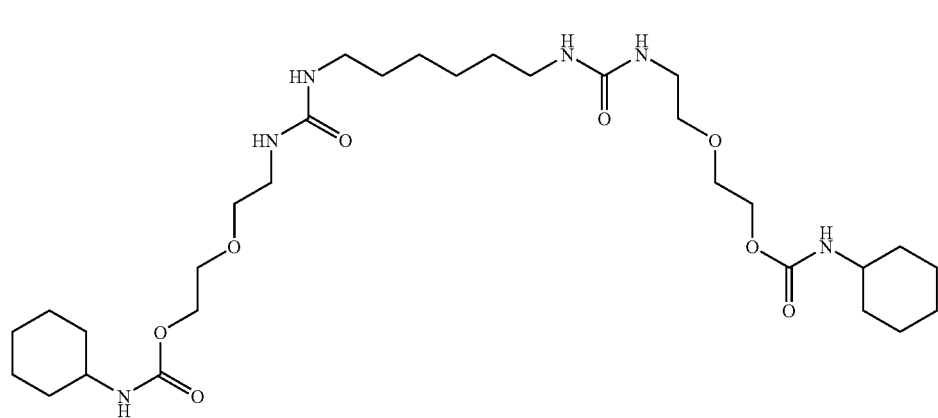
(VII)

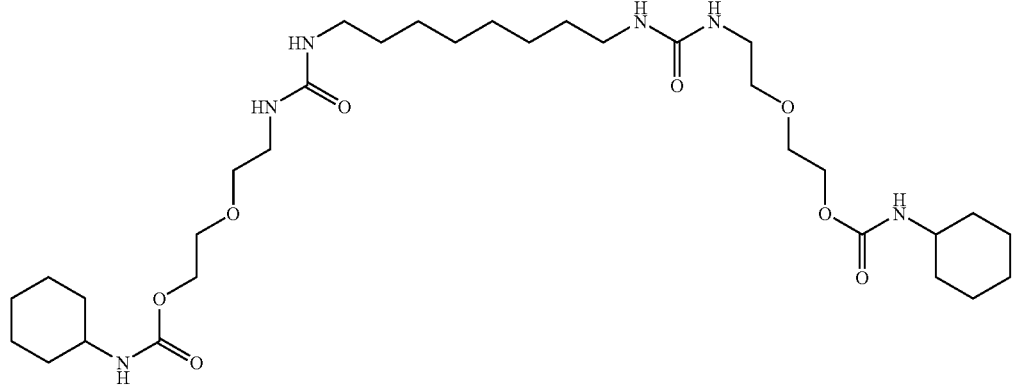
(VIII)
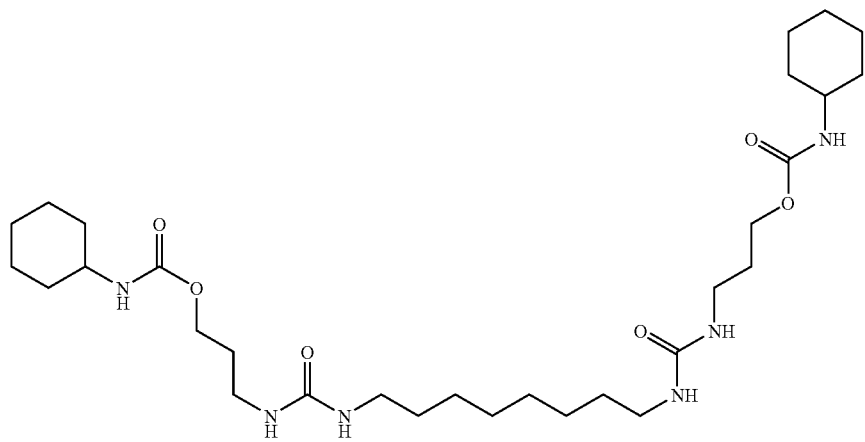
(IX)
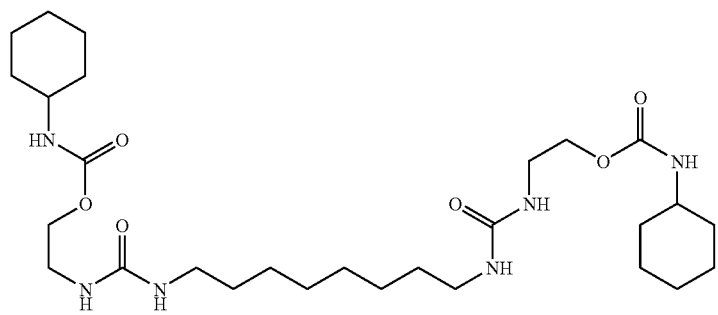
(X)
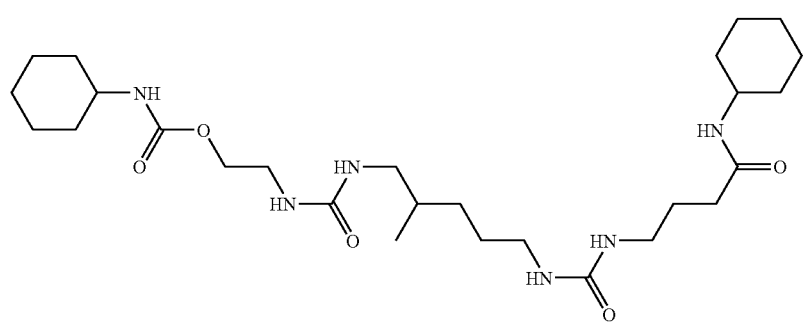
(XI)

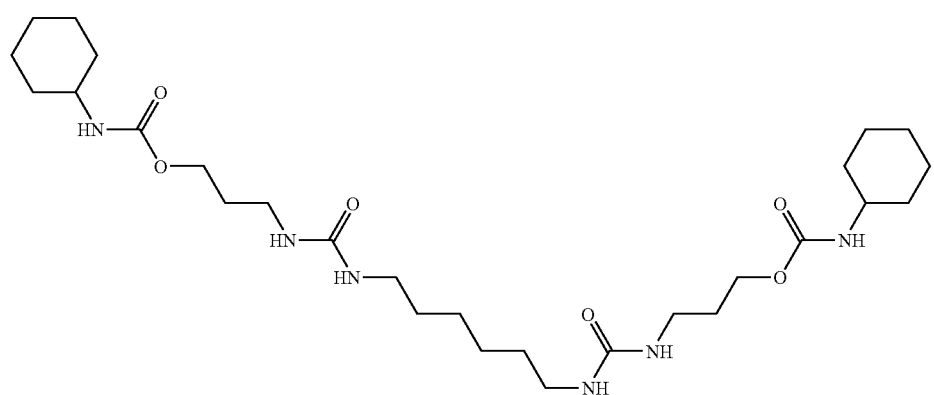
(XII)
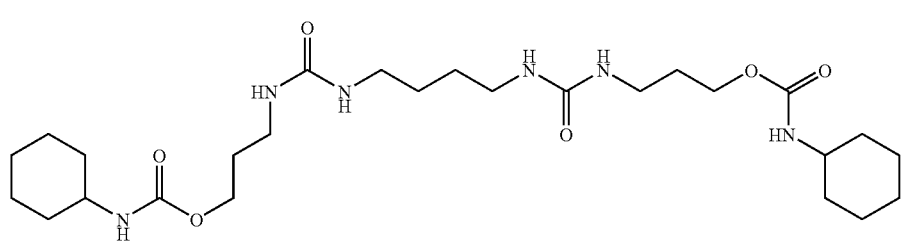
(XIII)
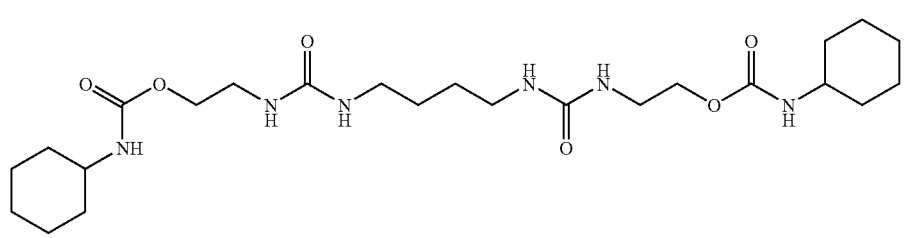
(XIV)
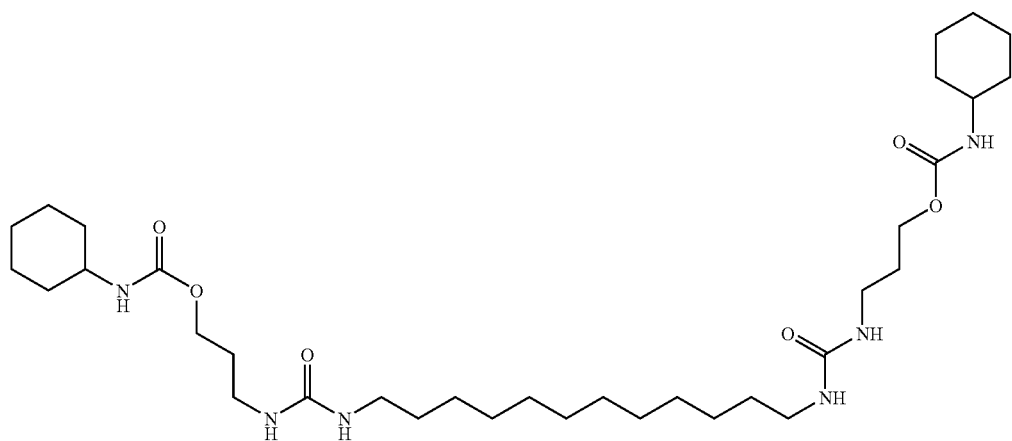
(XV)
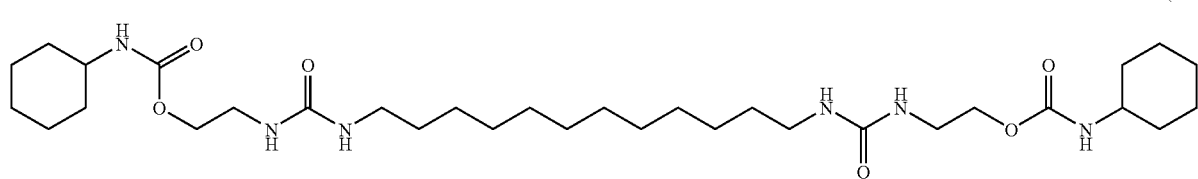
(XVI)

In another preferred embodiment, the present invention relates to compounds with for example the structure of formula (XVII). These structures are defined by formula (I) with p equal to 1, X equal to O, Y equal to NH and Z equal to NH, with $R^2$-$R^4$ as defined above.

These rheology control agents are prepared by first reacting a amino alcohol component with a monoisocyanate component. The obtained urea-alcohol is further reacted with a diisocyanate component.

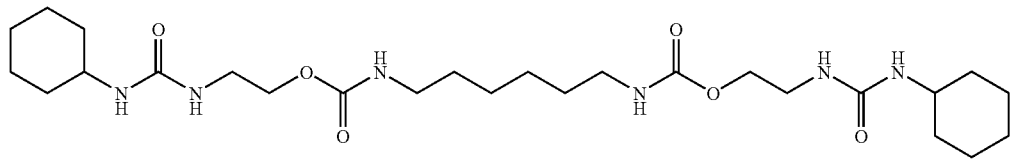

(XVII)

In another preferred embodiment, the present invention relates to compounds with for example the structure of formulae (XVIII) to (XXII). These structures are defined by formula (I) with p equal to 1, X equal to NH, Y equal to O and Z equal to nothing, with $R^2$-$R^4$ as defined above.

These rheology control agents are prepared by first reacting an amino alcohol component with a diisocyanate component. The reaction temperature and reactant concentration is selected to favor the selective formation of the intermediate addition product. Further reaction with an acylation equivalent (known to those skilled in the art, such as acyl chlorides, carboxylic anhydrides) forms the rheology control agent of this invention.

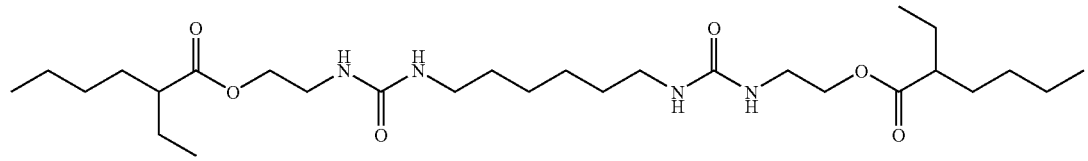

(XVIII)

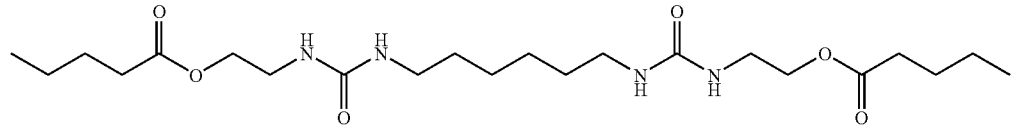

(XIX)

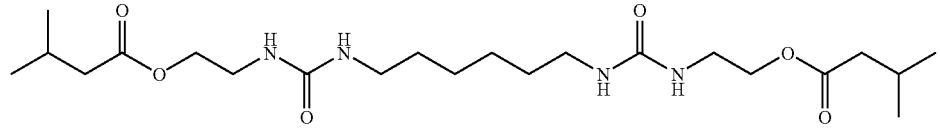

(XX)

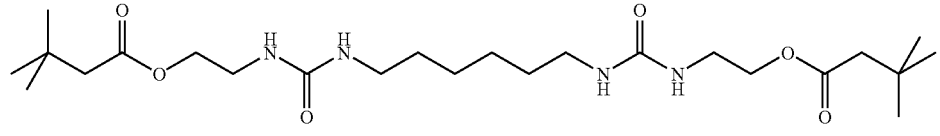

(XXI)

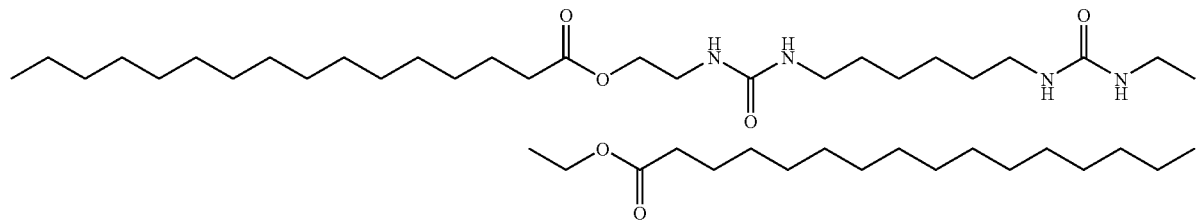

(XXII)

In another preferred embodiment, the present invention relates to compounds with for example the structure of formulae (XXIII) and (XXIV). These structures are defined by formula (I) with p equal to 2, X equal to NH, Y equal to O and Z equal to NH, with $R^3$-$R^4$ as defined above, with $R^2$ equal to

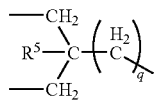

with $R^5$ equal to H and q equal to 0.

These rheology control agents are prepared by first reacting an amino bis-alcohol component with a diisocyanate component. The reaction temperature, conditions and reactant concentration is selected to favor the formation of the intermediate addition product, a bis-urea tetraol derivative. Further reaction with a mono-isocyanate component forms the rheology control agent of this invention.

In another preferred embodiment, the present invention relates to compounds with for example the structure of formulae (XXV). These structures are defined by formula (I) with p equal to 3, X equal to NH, Y equal to O and Z equal to nothing, with $R^3$-$R^4$ as defined above, with $R^2$ equal to

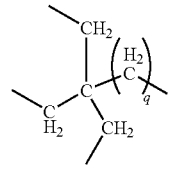

These rheology control agents are prepared by first reacting an amino tris-alcohol component with a diisocyanate component. The reaction temperature, conditions and reactant concentration is selected to favor the formation of the intermediate addition product, a bis-urea hexanol derivative. Further reaction with an acylation equivalent (known to those skilled in the art, such as acyl chlorides, carboxylic anhydrides) forms the rheology control agent of this invention.

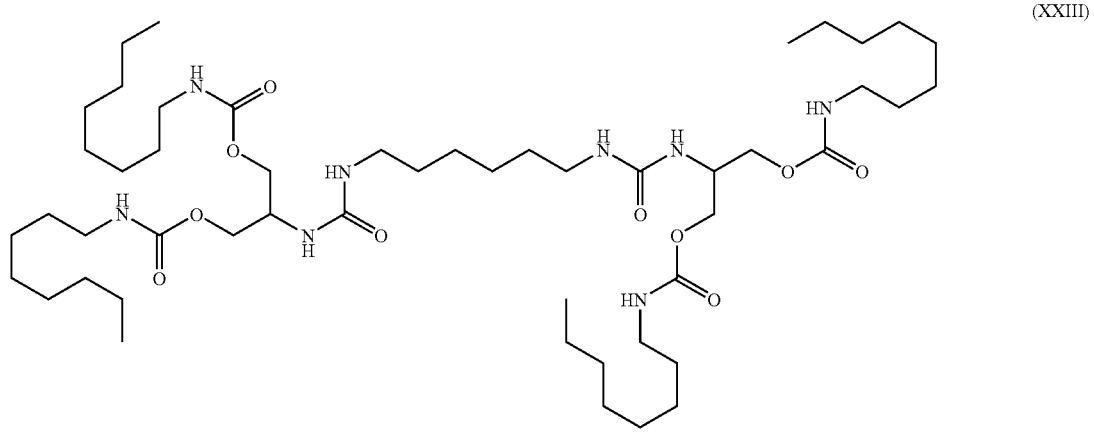

(XXIII)

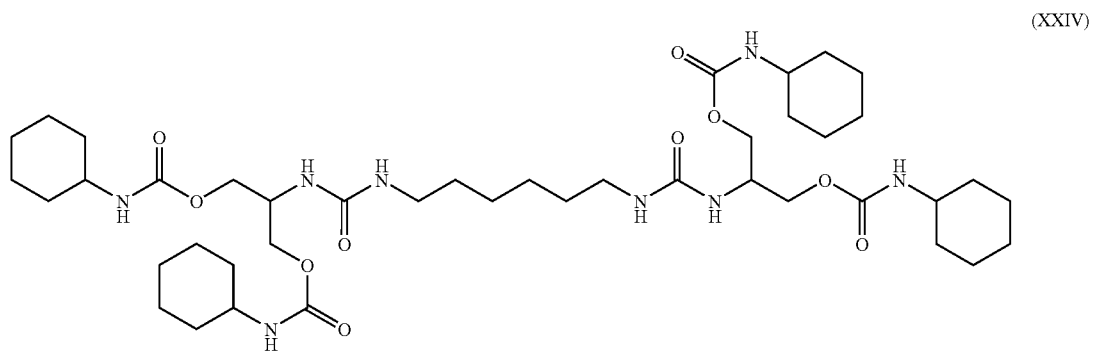

(XXIV)

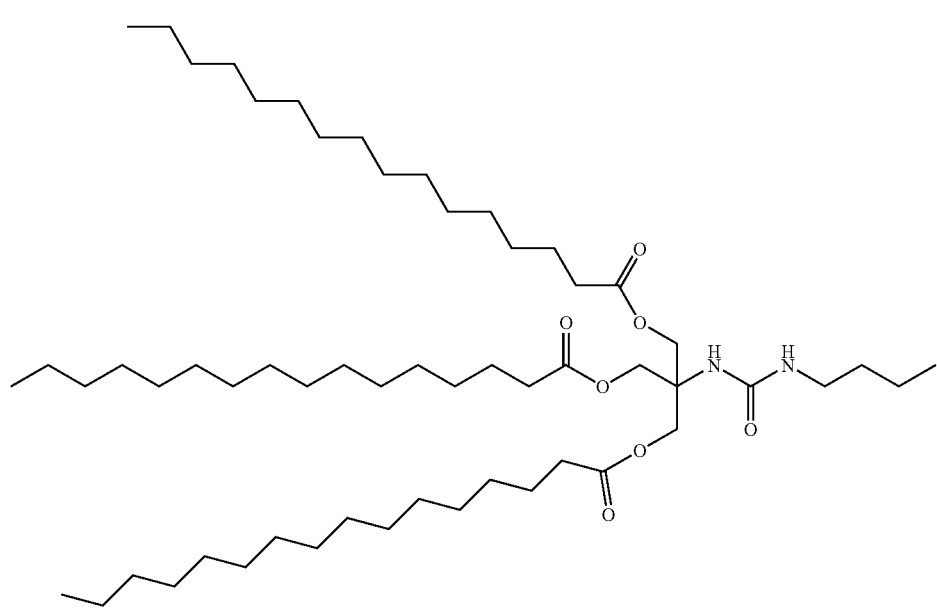

(XXV)

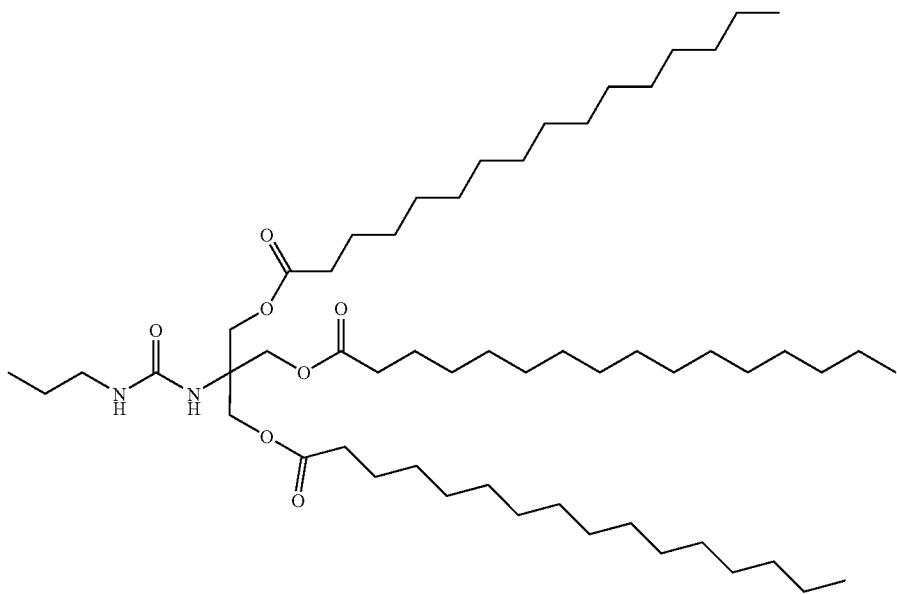

In another preferred embodiment, the present invention relates to compounds with for example the structure of formulae (XXVI) to (XXIX). These structures are defined by formula (I) with p equal to 0, X equal to NH, with $R^2$ is as defined above and $R^3$ is a branched alkylene group.

These rheology control agents are prepared by reacting an diisocyanate, in the indicated examples 2-methyl-1,5-pentamethylene diisocyanate, with two equivalents of monoamine, alternatively these compounds may be prepared by reacting the corresponding diamine, such as 2-methyl-1,5-pentamethylene diamine, with two equivalents of the alkyl monoisocyanate.

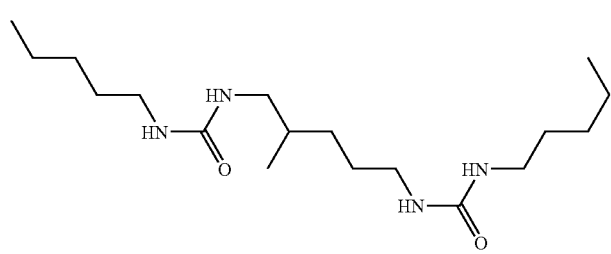
(XXVI)

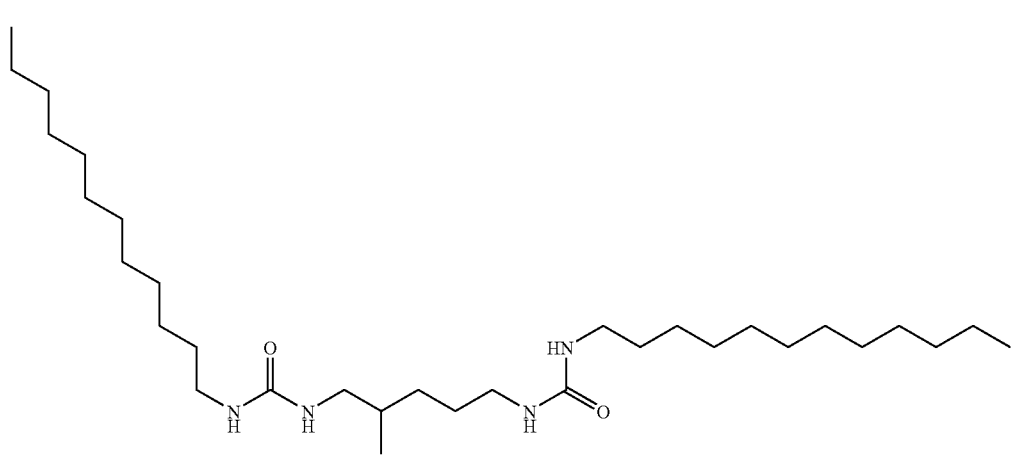
(XXVII)

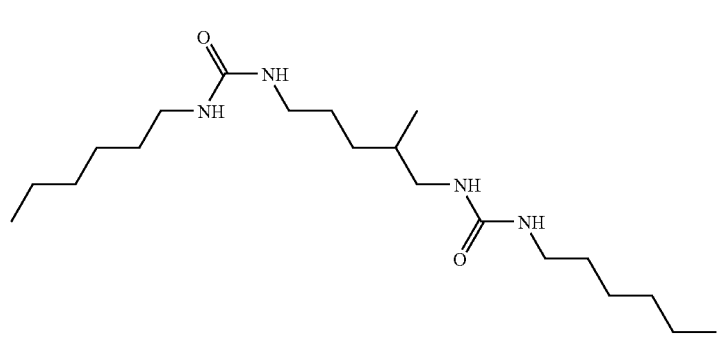
(XXVIII)

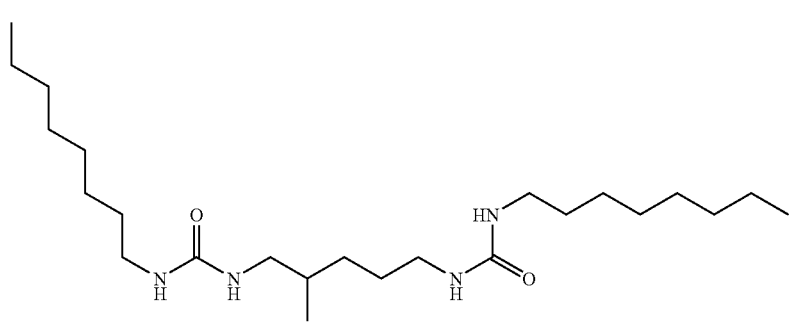
(XXIX)

In another preferred embodiment, the present invention relates to compounds with for example the structures of formula (XXX) to (XXXV). These structures are defined by formula (I) with p equal to 0, X equal to NH, with $R^2$ as defined above and $R^3$ being a —$(CH_2)_w$OC(O)—$(CH_2)_s$C(O)O$(CH_2)_t$— group with w, t equal to 1, 2, or 3 and s equal to 1 to 12 (note when p is 0, $R^4$ is also 0).

These rheology control agents are prepared by first reacting an amino alcohol component with a monoisocyanate component. This intermediate urea alcohol is further reacted with a difunctional acylating component equivalent (known to those skilled in the art, such as bis-acyl chlorides, or bis-carboxylic anhydrides) to form the rheology control agent. Alternatively, the parent bis-carboxylic acids may be utilized in a selective esterification reaction to form the desired products.

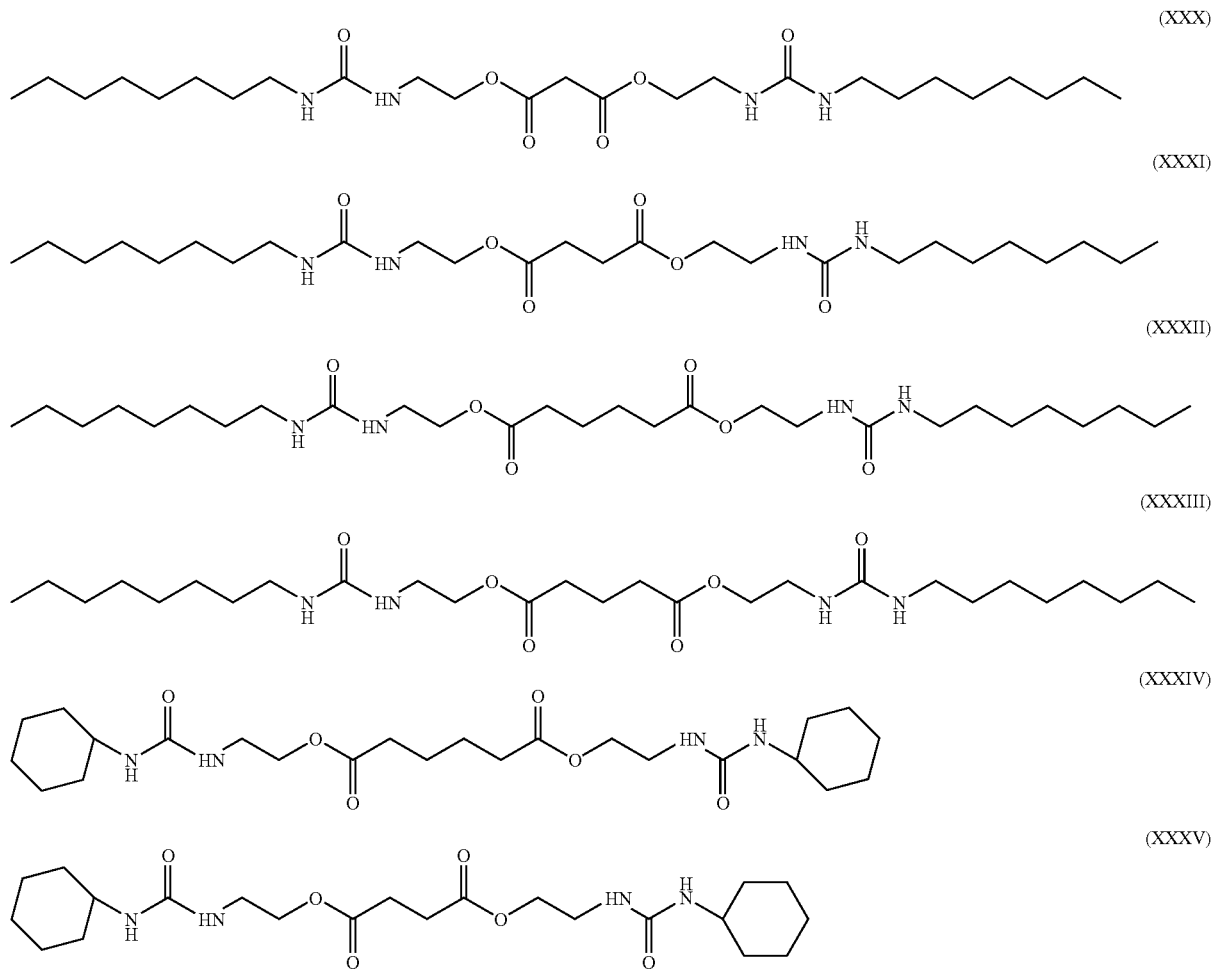

In another preferred embodiment, the present invention relates to compounds with for example the structures of formula (XXXVI) to (XLII). These structures are defined by formula (I) with p equal to 1, X equal to NH, Y equal to nothing, with Z equal to O, with $R^2$-$R^4$ as defined above.

These rheology control agents are prepared by reacting two equivalents of an alpha-amino ester component with a diisocyanate component. Alternatively, two equivalents of a glycin-ester derived isocyanate or a longer chain ester isocyanate can be used in a reaction with a diamine to form these structures.

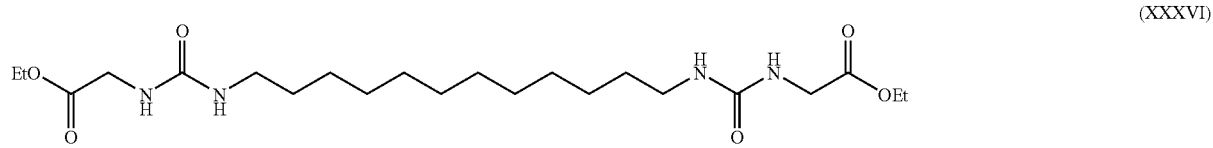

(XXXVII)
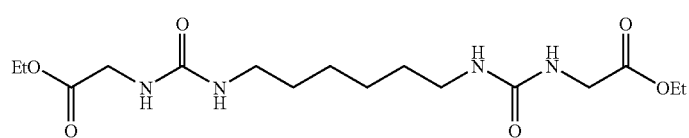

(XXXVIII)
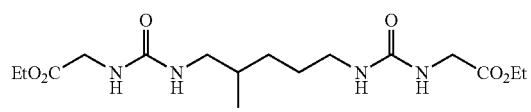

(XXXIX)
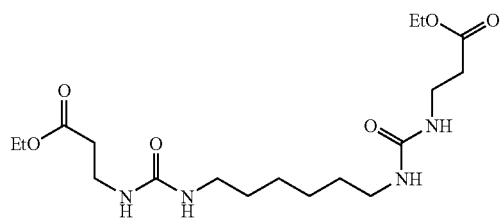

(XXXL)
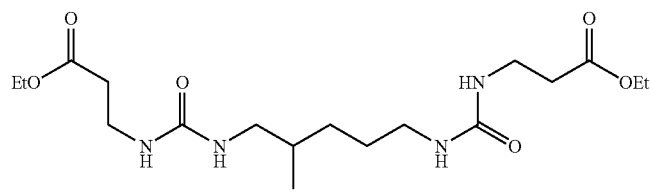

(XLI)
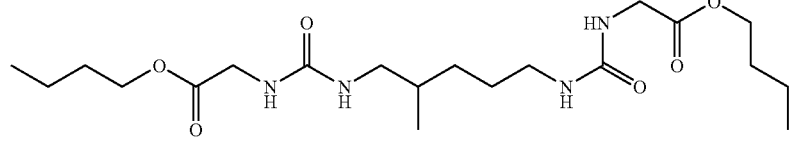

(XLII)
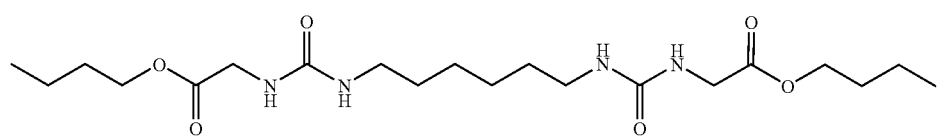

In another preferred embodiment, the present invention relates to compounds with for example the structure of formula (XLIII). This structure is defined by formula (I) with p equal to 0, X equal to NH, $R^2$ is as defined above, $R^3$ equal to a —$CHR^6C(O)O$—$R^8$—$OC(O)CHR^7$— group, with $R^6$, $R^7$ and $R^8$ defined as above. This rheology control agent is prepared by reacting a diol with an amino acid under esterification conditions, followed by isolation of the amino-acid di-ester. This di-ester is reacted with a two equivalents of monoisocyanate to form the product.

(XLIII)
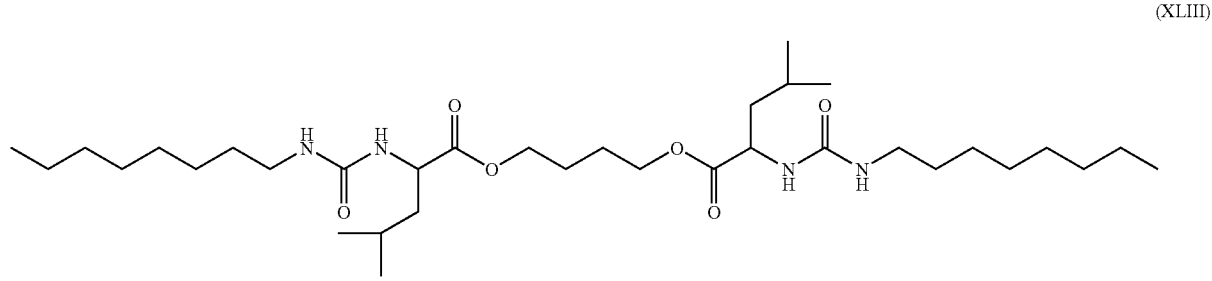

In another preferred embodiment, the present invention relates to compounds with for example the structure of formula (XLIV). This structure is defined by formula (II) with $R^9$ and $R^{10}$ defined as above.

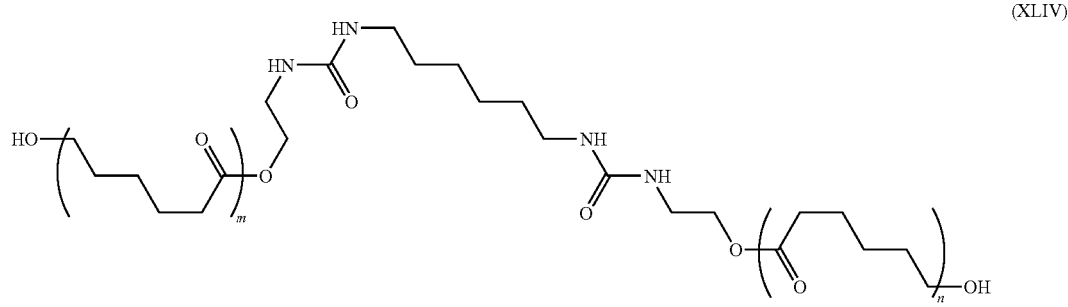

(XLIV)

wherein n=1-7, m=1-7.

Generally, compounds (IV) to (XLIV) may be formed using a variety of routes for chemical synthesis. One such route for example may be based on reacting an amine with an isocyanate in a suitable reaction vessel generally at a temperature between 0° C. and 120° C., preferably, from 10° C. to 80° C., optionally, in the presence of a diluent. Depending on the specific rheology control agent of this invention the synthesis might be formally separated into several steps. These steps may be carried out sequentially in one reaction vessel or in different reaction vessels followed by separation and/or purification steps. Certain rheology control agents of this invention may be formed by first reacting an amino alcohol component with a monoisocyanate component. This intermediate is further reacted with a diisocyanate component to form the rheology control agent. Certain rheology control agents of this invention may be formed by first reacting an amino alcohol component with a monoisocyanate component. This intermediate is further reacted with a difunctional acylating component equivalent (known to those skilled in the art, such as acyl chlorides, carboxylic anhydrides) to form the rheology control agent. Certain rheology control agents are formed by first reacting an amino alcohol component with a diisocyanate component. The reaction temperature and reactant concentration is selected to favor the formation of the intermediate addition product. Further reaction with a mono-isocyanate component forms the rheology control agent of this invention. Certain rheology control agents are formed by first reacting an amino alcohol component with a diisocyanate component. The reaction temperature and reactant concentration is selected to favor the selective formation of the intermediate addition product. Further reaction with an acylation equivalent (known to those skilled in the art, such as acyl chlorides, carboxylic anhydrides) forms the rheology control agent of this invention. Certain rheology control agents of this invention are formed by reaction of mono-isocyanates with diamines. Certain rheology control agents of this invention are formed by reaction of mono-amine with diisocyanates. Other rheology control agents of this invention are formed by first reacting an amino alcohol component with a diisocyanate component. The reaction temperature and reactant concentration is selected to favor the formation of the intermediate addition product. This intermediate is further reacted with a lactone component to form the rheology control agent.

The rheology control agent can be formulated, dissolved or dispersed in typical organic solvents. More preferably, the solvent is a ketone, ester, acetate, blend of ester and alcohol, aprotic amide, aprotic sulfoxide, or aprotic amine. Examples of useful solvents include methyl ethyl ketone, methyl isobutyl ketone, methyl amyl ketone, amyl acetate, ethylene glycol butyl ether acetate, propylene glycol monomethyl ether acetate, xylene, N-methylpyrrolidone, blends of acetate and butanol or blends of aromatic hydrocarbons.

The rheology control agent of this invention can be combined with the film forming coating system using a range of methods. The rheology control agent can be added to the film forming coating mixture as a solid in powder form. The use of agitation methods as known to those skilled in the art may be used to disperse, dissolve or distribute the rheology control agent. The use of a high speed disperser has been found to be a particularly effective dispersing technique at dispersing these rheology control agents in a binder component and solvent of the coating formulation. This dispersion is subsequently added to the other components of the coating formulation to make the final coating composition. Alternatively, the rheology control agent can be prepared directly using the binder system of the film forming coating mixture as the reaction medium using the general synthesis procedures outlined above.

Conventional rheology control agents has been produced in the presence of a binder resin, as shown, for example, in GB 1454414, wherein a urea adduct is prepared in situ in the presence of the binder. The rheology control agents of this invention may also be produced in the presence of a binder to form directly the desired Theologically active structure in the binder resin. The extension of such structure formation can be adjusted as known to those skilled in the art using for example a shear treatment, or by modifying the mixing conditions.

The rheology control agents of this invention may also be prepared following the outlined synthesis procedures directly from the starting materials described above by using a non-solvent, which has a limited solubility for the product. This strategy results in a precipitate that can be used as such, be milled in order to reduce the average length, or be re-crystallized, for example to increase the purity or to change the structural morphology or fibril length. In the preparation process of the rheology control agent the dosing conditions or the stirrer speed can be changed to influence the average structure build or fiber formation. Alternatively, the rheology control agent of this invention can be prepared as a true solution at temperatures between 0 and 150° C. If the solvent is selected such that it has affinity for the binder, the solution can be combined with said binder and form the rheology controlling structure such as a fiber directly in said binder. Suitable solvents for this purpose are, for example, N-methyl pyrrolidone (NMP) or dimethyl acetamide, n-butanol, or other aliphatic alcohols, or aliphatic diols, or butylglycol.

Alternatively, the rheology control agents of this invention may also be utilized in the form of their solutions in a polar aprotic solvent containing 0.1-3.0 mols of an additive per urea group. The rheology control agents of this invention as defined above have a solids content of 10-75 wt. % and preferably of 15-40 wt. %. These solutions of the rheology control agent can be used as additives for a coating formulation.

Optionally, inorganic compounds can be added to maximize the solids content and stability of these solutions. By stability is meant no significant precipitation upon aging either at room temperature or at elevated temperature (up to 50° C.) storage. Preferred inorganic compounds used in these solutions and are selected from LiCl, LiBr, NaCl, KCl, CaCl2, LiNO3, LiOC(O)Me or other Li-salts of carboxylic acids, benzoic acids or substituted benzoic acids, with LiCl as the preferred inorganic compound. Surprisingly, it has been found that some of these rheology control agents can be dissolved at high solids (>10% by weight) in solvent without the use of these inorganic compounds.

The novel rheology control agents are useful in a wide variety of solvent-borne coating compositions, such as, clear coating compositions, base coating compositions, pigmented mono coating compositions, primer surfacers, primer fillers and sealers. Typical binders used in these compositions are acrylic polymers, such as, poly(meth)acrylates, meaning both polyacrylates and poly(meth)acrylates, branched, grafted or segmented poly(meth)acrylates, polyacrylourethanes, polyesters, branched copolyesters, oligomers, polyester urethanes and polyepoxides. Typical crosslinking agents which may be used in these compositions are polyisocyanates, blocked polyisocyanates, melamine crosslinking agents, alkylated melamines, silanes, benzoguanamines and other crosslinking agents known to those skilled in the art.

The acrylic polymers used to form the novel coating composition of this invention may be random polymers or structured copolymers, such as, block or graft copolymers. Particularly useful structured polymers are branched acrylic polymers having segmented arms as disclosed in U.S. Ser. No. 10/983,462 filed on Nov. 8, 2004 and U.S. Ser. No. 10/983,875 filed on Nov. 8, 2004, both of which are incorporated herein by reference.

A block copolymer used in the present invention may have an AB diblock structure, or ABA or ABC triblock structure, for example. Graft copolymers can be used in the present invention having a backbone segment and a side chain segment(s). Random copolymers that can be used have polymer segments randomly distributed in the polymer chain.

Acrylic AB, ABA or ABC block copolymers can be prepared by using a stepwise polymerization process such as anionic, group transfer polymerization (GTP) taught in U.S. Pat. No. 4,508,880, Webster et al., ""Living" polymers and process for their preparation", atom transfer radical polymerization (ATRP) taught in U.S. Pat. No. 6,462,125, White et al., and radical addition fragmentation transfer (RAFT) taught in U.S. Pat. No. 6,271,340, Anderson, et al. "Method of controlling polymer molecular weight and structure". All of the above, herein incorporated by reference. Polymers so produced have precisely controlled molecular weight, block sizes and very narrow molecular weight distributions.

Graft copolymers may be prepared by a macromonomer approach using the special cobalt chain transfer (SCT) method reported in U.S. Pat. No. 6,472,463, Ma, the disclosure of which is herein incorporated by reference.

Random copolymers can be prepared using conventional free radical polymerization techniques as described in U.S. Pat. No. 6,451,950, Ma, the disclosure of which is herein incorporated by reference.

Typically useful acrylic polymers have a number average molecular weight of about 1,000 to 100,000, a Tg of 10 to 100° C. and contain moieties, such as, hydroxyl, carboxyl, glycidyl and amino groups. Typically useful acrylic polymers are known in the art and the following are typical examples of monomers used to form such polymers: linear alkyl (meth) acrylates having 1 to 12 carbon atoms in the alkyl group, cyclic or branched alkyl (meth)acrylates having 3 to 12 carbon atoms in the alkyl group including isobornyl (meth) acrylate, hydroxy alkyl (meth)acrylates having 1 to 4 carbon atoms in the alkyl group, glycidyl (meth)acrylate, hydroxy amino alkyl (meth)acrylates having 1 to 4 carbon atoms in the alkyl group, and the polymers can contain styrene, alpha methyl styrene, vinyl toluene, (meth)acrylonitrile (meth) acryl amides, (meth)acrylic acid, (meaning both acrylic acid and methacrylic acid) trimethoxysilylpropyl (meth)acrylate and the like.

Examples of (meth)acrylic acid esters useful for forming these acrylic polymers are methyl acrylate, ethyl acrylate, isopropyl acrylate, tert.-butyl acrylate, n-butyl acrylate, isobutyl acrylate, 2-ethylhexyl acrylate, lauryl acrylate, stearyl acrylate and the corresponding methacrylates. Examples of (meth)acrylic acid esters with cyclic alcohols are cyclohexyl acrylate, trimethylcyclohexyl acrylate, 4-tert.-butylcyclohexyl acrylate, isobornyl acrylate and the corresponding methacrylates.

Additional unsaturated monomers that do not contain additional functional groups useful for forming the acrylic polymers are, for example, vinyl ethers, such as, isobutyl vinyl ether and vinyl esters, such as, vinyl acetate, vinyl propionate, vinyl aromatic hydrocarbons, preferably those with 8 to 9 carbon atoms per molecule. Examples of such monomers are styrene, alpha-methylstyrene, chlorostyrenes, 2,5-dimethylstyrene, p-methoxystyrene, vinyl toluene. Styrene is preferably used.

Small proportions of olefinically polyunsaturated monomers may also be used. These are monomers having at least 2 free-radically polymerizable double bonds per molecule. Examples of these are divinylbenzene, 1,4-butanediol diacrylate, 1,6-hexanediol diacrylate, neopentyl glycol dimethacrylate, glycerol dimethacrylate.

Hydroxy-functional (meth)acrylic polymers generally are formed by free-radical copolymerization using conventional processes well known to those skilled in the art, for example, bulk, solution or bead polymerization, in particular by free-radical solution polymerization using free-radical initiators.

Suitable hydroxyl-functional unsaturated monomers that are used to introduce hydroxyl groups into the acrylic polymer are, for example, hydroxyalkyl esters of alpha, beta-olefinically unsaturated monocarboxylic acids with primary or secondary hydroxyl groups. These may, for example, comprise the hydroxyalkyl esters of acrylic acid, methacrylic acid, crotonic acid and/or isocrotonic acid. The hydroxyalkyl esters of (meth)acrylic acid are preferred. Examples of suitable hydroxyalkyl esters of alpha, beta-olefinically unsaturated monocarboxylic acids with primary hydroxyl groups are hydroxyethyl (meth)acrylate, hydroxypropyl (meth)acrylate, hydroxybutyl (meth)acrylate, hydroxyamyl (meth)acrylate, hydroxyhexyl (meth)acrylate. Examples of suitable hydroxyalkyl esters with secondary hydroxyl groups are 2-hydroxypropyl (meth)acrylate, 2-hydroxybutyl (meth)acrylate, 3-hydroxybutyl (meth)acrylate.

Preferred are hydroxy functional acrylic polymers having a hydroxy equivalent weight of 300 to 1300 and are polymers of hydroxy alkyl (meth)acrylates and one or more of the aforementioned monomers. The hydroxyl equivalent weight is the grams of resin per equivalent of hydroxyl groups. The following are typically preferred acrylic polymers: styrene/methyl methacrylate/isobutyl methacrylate/hydroxyethyl (meth) acrylate; styrene/methyl methacrylate/isobutyl methacrylate/ 2-ethylhexyl methacrylate/isobornyl methacrylate/hydroxyethyl (meth)acrylate and styrene/isobornyl methacrylate/2-ethylhexyl methacrylate/hydroxy propyl methacrylate/ hydroxyethyl (meth)acrylate. One particularly preferred hydroxy containing acrylic polymer contains 35 to 50% by weight styrene, 15 to 25% by weight ethylhexyl methacrylate and 15 to 20% by weight isobornyl methacrylate and 20 to 30% by weight hydroxyethyl methacrylate.

Additional useful hydroxy-functional unsaturated monomers are reaction products of alpha, beta-unsaturated monocarboxylic acids with glycidyl esters of saturated monocarboxylic acids branched in alpha position, for example with glycidyl esters of saturated alpha-alkylalkanemonocarboxylic acids or alpha,alpha'-dialkylalkanemonocarboxylic acids. These preferably comprise the reaction products of (meth) acrylic acid with glycidyl esters of saturated alpha,alpha-dialkylalkanemonocarboxylic acids with 7 to 13 carbon atoms per molecule, particularly preferably with 9 to 11 carbon atoms per molecule. These reaction products may be formed before, during or after the copolymerization reaction.

Further usable hydroxy-functional unsaturated monomers are reaction products of hydroxyalkyl (meth)acrylates with lactones. Hydroxyalkyl (meth)acrylates which may be used are, for example, those stated above. Suitable lactones are, for example, those that have 3 to 15 carbon atoms in the ring, wherein the rings may also comprise different substituents. Preferred lactones are gamma-butyrolactone, delta-valerolactone, epsilon-caprolactone, beta-hydroxy-beta-methyl-delta-valerolactone, lambda-laurolactone or mixtures thereof. Epsilon-caprolactone is particularly preferred. The reaction products preferably comprise those prepared from 1 mole of a hydroxyalkyl ester of an alpha, beta-unsaturated monocarboxylic acid and 1 to 5 moles, preferably on average 2 moles, of a lactone. The hydroxyl groups of the hydroxyalkyl esters may be modified with the lactone before, during or after the copolymerization reaction.

Suitable unsaturated monomers that can be used to provide the acrylic polymer with carboxyl groups are, for example, olefinically unsaturated monocarboxylic acids, such as, for example, acrylic acid, methacrylic acid, crotonic acid, isocrotonic acid, itaconic acid. Acrylic acid and methacrylic acid are preferably used.

Suitable unsaturated monomers that can be used to provide the acrylic polymer with glycidyl groups are, for example, allyl glycidyl ether, 3,4-epoxy-1-vinylcyclohexane, epoxycyclohexyl (meth)acrylate, vinyl glycidyl ether and glycidyl (meth)acrylate. Glycidyl (meth)acrylate is preferably used.

Free-radically polymerizable, olefinically unsaturated monomers which, apart from at least one olefinic double bond, do not contain additional functional groups that can be used to form the acrylic polymer are, for example, esters of unsaturated carboxylic acids with aliphatic monohydric branched or unranked as well as cyclic alcohols with 1 to 20 carbon atoms. The unsaturated carboxylic acids, which may be considered, are acrylic acid, methacrylic acid, crotonic acid and isocrotonic acid. Esters of (meth)acrylic acid are preferred.

The acrylic polymer can contain (meth)acrylamides. Typical examples of such acrylic polymers are polymers of (meth) acrylamide and alkyl (meth)acrylates, hydroxy alkyl (meth) acrylates, (meth)acrylic acid and or one of the aforementioned ethylenically unsaturated polymerizable monomers.

Acrylic oligomers having a number average molecular weight of 300 to 3,000 of the aforementioned monomeric components also can be used as an optional polymeric component. Useful acrylic oligomers are disclosed in U.S. Ser. No. 10/617,585 filed Jul. 11, 2003. By using monomers and reactants well known to those skilled in the art, these oligomers can have the one or more of the following groups that are reactive with isocyanate: hydroxyl, carboxyl, glycidyl, amine, aldimine, phosphoric acid and ketimine.

Acrylourethanes also can be used to form the novel coating composition of this invention. Typical useful acrylourethanes are formed by reacting the aforementioned acrylic polymers with an organic polyisocyanate. Generally, an excess of the acrylic polymer is used so that the resulting acrylourethane has terminal acrylic segments having reactive groups as described above. These acrylourethanes can have reactive end groups and/or pendant groups such as hydroxyl, carboxyl, amine, glycidyl, amide, silane or mixtures of such groups. Useful organic polyisocyanates are described hereinafter as the crosslinking component but also can be used to form acrylourethanes useful in this invention. Typically useful acrylourethanes are disclosed in Stamegna et al. U.S. Pat. No. 4,659,780, which is hereby incorporated by reference.

Polyesters can also be used, such as, hydroxyl or carboxyl terminated or hydroxyl or carboxyl containing polyesters. The following are typically useful polyesters or ester oligomers: polyesters or oligomers of caprolactone diol and cyclohexane dimethylol, polyesters or oligomers of tris-hydroxy ethylisocyanurate and caprolactone, polyesters or oligomers of trimethylol propane, phthalic acid or anhydride and ethylene oxide, polyesters or oligomers of pentaerythritol, hexahydrophthalic anhydride and ethylene oxide, polyesters or oligomers of pentaerythritol, hexahydrophthalic anhydride and butylene oxide as disclosed in U.S. Pat. No. 6,221,484 B1.

The aforementioned polyesters and oligomers can be reacted with an organic isocyanate to form polyesterurethane polymers and oligomers that can be used in the novel composition.

One useful polyesterurethane that can used in the composition is formed by reacting an aliphatic polyisocyanate with an aliphatic or cycloaliphatic monohydric alcohol and subsequently reacting the resulting composition with a hydroxy functional aliphatic carboxylic acid until all of the isocyanate groups have been reacted. One useful polyurethane oligomer comprises the reaction product of the isocyanurate of hexane diisocyanate, cyclohexanol and dimethylol propionic acid.

Useful branched copolyesters polyols and the preparation thereof are described in WO 03/070843 published Aug. 28, 2003, which is hereby incorporated by reference.

The branched copolyester polyol has a number average molecular weight not exceeding 30,000, alternately in the range of from 1,000 to 30,000, further alternately in the range of 2,000 to 20,000, and still further alternately in the range of 5,000 to 15,000. The copolyester polyol has hydroxyl groups ranging from 5 to 200 per polymer chain, preferably 6 to 70, and more preferably 10 to 50, and carboxyl groups ranging from 0 to 40 per chain, preferably 1 to 40, more preferably 1 to 20 and most preferably 1 to 10. The Tg (glass transition temperature) of the copolyester polyol ranges from −70° C. to 50° C., preferably from −65° C. to 40° C., and more preferably from −60° C. to 30° C.

The branched copolyester polyol is conventionally polymerized from a monomer mixture containing a chain extender selected from the group consisting of a hydroxy carboxylic acid, a lactone of a hydroxy carboxylic acid and a combination thereof; and one or more hyper branching monomers.

The following additional ingredients can be included in the coating composition, particularly when the coating composition is useful as a lacquer, in amounts of 0.1% to 98% by weight and alternately in the range of 50% to 95% by weight, all based on the weight of the binder of the coating composition:

Useful acrylic alkyd polymers having a weight average molecular weight ranging from 3,000 to 100,000 and a Tg ranging from 0° C. to 100° C. are conventionally polymerized from a monomer mixture that can include one or more of the following monomers: an alkyl (meth)acrylate, for example, methyl (meth)acrylate, butyl (meth)acrylate, ethyl (meth) acrylate, 2-ethyl hexyl (meth)acrylate; a hydroxy alkyl (meth)acrylate, for example, hydroxy ethyl (meth)acrylate, hydroxy propyl (meth)acrylate, hydroxy butyl (meth)acrylate; (meth)acrylic acid; styrene; and alkyl amino alkyl (meth) acrylate, for example, diethylamino ethyl (meth)acrylate or t-butyl aminoethyl methacrylate; and one or more of the following drying oils: vinyl oxazoline drying oil esters of linseed oil fatty acids, tall oil fatty acids or tung oil fatty acids.

One preferred polymer is polymerized from a monomer mixture that contains an alkyl (meth)acrylate, hydroxy alkyl acrylate, alkylamino alkyl acrylate and vinyl oxazoline ester of drying oil fatty acids.

Suitable iminiated acrylic polymers can be obtained by reacting acrylic polymers having carboxyl groups with an alkylene imine, such as propylene imine.

Suitable cellulose acetate butyrates are supplied by Eastman Chemical Co., Kingsport, Tenn. under the trade names CAB-381-20 and CAB-531-1 and are preferably used in an amount of 0.1 to 20% by weight based on the weight of the binder.

A suitable ethylene-vinyl acetate co-polymer (wax) is supplied by Honeywell Specialty Chemicals—Wax and Additives, Morristown, N.J., under the trade name A-C® 405 (T) Ethylene—Vinyl Acetate Copolymer.

Suitable nitrocellulose resins preferably have a viscosity of about ½-6 seconds. Preferably, a blend of nitrocellulose resins is used. Optionally, the lacquer can contain ester gum and castor oil.

Suitable alkyd resins are the esterification products of a drying oil fatty acid, such as linseed oil and tall oil fatty acid, dehydrated castor oil, a polyhydric alcohol, a dicarboxylic acid and an aromatic monocarboxylic acid. Typical polyhydric alcohols that can be used to prepare the alkyd resin used in this invention are glycerine, pentaerythritol, trimethylol ethane, trimethylol propane; glycols, such as ethylene glycol, propylene glycol, butane diol and pentane diol. Typical dicarboxylic acids or anhydrides that can be used to prepare the alkyd resin are phthalic acid, phthalic anhydride, isophthalic acid, terephthalic acid maleic, and fumaric acid. Typical monocarboxylic aromatic acids are benzoic acid, paratertiary butylbenzoic acid, phenol acetic acid and triethyl benzoic acid. One preferred alkyd resin is a reaction product of an acrylic polymer and an alkyd resin.

Suitable plasticizers include butyl benzyl phthalate, dibutyl phthalate, triphenyl phosphate, 2-ethylhexylbenzyl phthalate, dicyclohexyl phthalate, diallyl toluene phthalate, dibenzyl phthalate, butylcyclohexyl phthalate, mixed benzoic acid and fatty oil acid esters of pentaerythritol, poly(propylene adipate) dibenzoate, diethylene glycol dibenzoate, tetrabutylthiodisuccinate, butyl phthalyl butyl glycolate, acetyltributyl citrate, dibenzyl sebacate, tricresyl phosphate, toluene ethyl sulfonamide, the di-2-ethyl hexyl ester of hexamethylene diphthalate, and di(methyl cyclohexyl) phthalate. One preferred plasticizer of this group is butyl benzyl phthalate.

If desired, the coating composition can include metallic driers, chelating agents, or a combination thereof. Suitable organometallic driers include cobalt naphthenate, copper naphthenate, lead tallate, calcium naphthenate, iron naphthenate, lithium naphthenate, lead naphthenate, nickel octoate, zirconium octoate, cobalt octoate, iron octoate, zinc octoate, and alkyl tin dilaurates, such as dibutyl tin dilaurate. Suitable chelating agents include aluminum monoisopropoxide monoversatate, aluminum (monoiospropyl)phthalate, aluminum diethoxyethoxide monoversatate, aluminum trisecondary butoxide, aluminum diisopropoxide monoacetacetic ester chelate and aluminum isopropoxide.

Also, polytrimethylene ether diols may be used as an additive having a number average molecular weight (Mn) in the range of from 500 to 5,000, alternately in the range of from 1,000 to 3,000; a polydispersity in the range of from 1.1 to 2.1 and a hydroxyl number in the range of from 20 to 200. The preferred polytrimethylene ether diol has a Tg of −75° C. Copolymers of polytrimethylene ether diols are also suitable. For example, such copolymers are prepared by copolymerizing 1,3-propanediol with another diol, such as, ethane diol, hexane diol, 2-methyl-1,3-propanediol, 2,2-dimethyl-1,3-propanediol, trimethylol propane and pentaerythritol, wherein at least 50% of the copolymer results from 1,3-propanediol. A blend of a high and low molecular weight polytrimethylene ether diol can be used wherein the high molecular weight diol has an Mn ranging from 1,000 to 4,000 and the low molecular weight diol has an Mn ranging from 150 to 500. The average Mn of the diol should be in the range of 1,000 to 4,000. It should be noted that, the polytrimethylene ether diols suitable for use in the present invention can include polytrimethylene ether triols and other higher functionality polytrimethylene ether polyols in an amount ranging from 1 to 20%, by weight, based on the weight of the polytrimethylene ether diol. It is believed that the presence of polytrimethylene ether diols in the crosslinked coating composition of this invention can improve the chip resistance of a coating resulting therefrom.

Additional details of the foregoing additives are provided in U.S. Pat. Nos. 3,585,160, 4,242,243, 4,692,481, and U.S. Re 31,309, which are incorporated therein by reference.

Crosslinking Agents

Lacquer coating compositions can be formulated without the use of a crosslinking agent. Typical crosslinkable compositions that utilize the novel rheology control agents are solvent borne compositions having a binder containing in the range of 25-95 percent by weight of one of the aforementioned film forming polymers and 5-75 percent by weight of a crosslinking agent. Preferably, the binder contains in the range of 40-90 percent by weight of the film forming polymer and 10-60 percent by weight of the crosslinking agent. Useful crosslinking agents include organic polyisocyanates, blocked organic polyisocyanates, melamines, alkylated melamines, benzoquanamines, epoxides and silanes Typically useful organic polyisocyanates crosslinking agents that can be used in the novel composition of this invention include aliphatic polyisocyanates, cycloaliphatic polyisocyanates and isocyanate adducts. Typical polyisocyanates can contain within the range of 2 to 10, preferably 2.5 to 8, more preferably 3 to 5 isocyanate functionalities. Generally, the ratio of equivalents of isocyanate functionalities on the polyisocyanate per equivalent of all of the functional groups present ranges from 0.5/1 to 3.0/1, preferably from 0.7/1 to 1.8/1, more preferably from 0.8/1 to 1.3/1.

Examples of suitable aliphatic and cycloaliphatic polyisocyanates that can be used include the following: 4,4'dicyclohexyl methane diisocyanate, ("H$_{12}$MDI"), trans-cyclohexane-1,4-diisocyanate, 1,6-hexamethylene diisocyanate ("HDI"), isophorone diisocyanate, ("IPDI"), other aliphatic or cycloaliphatic di-, tri- or tetra-isocyanates, such as, 1,2-propylene diisocyanate, tetramethylene diisocyanate, 2,3-butylene diisocyanate, octamethylene diisocyanate, 2,2,4-trimethyl hexamethylene diisocyanate, dodecamethylene diisocyanate, omega-dipropyl ether diisocyanate, 1,3-cyclopentane diisocyanate, 1,2 cyclohexane diisocyanate, 1,4 cyclohexane diisocyanate, 4-methyl-1,3-diisocyanatocyclohexane, dicyclohexylmethane-4,4'-diisocyanate, 3,3'-dimethyl-dicyclohexylmethane 4,4'-diisocyanate, polyisocyanates having isocyanurate structural units, such as, the isocyanurate of hexamethylene diisocyanate and the isocyanurate of isophorone diisocyanate, the adduct of 2 molecules of a diisocyanate, such as, hexamethylene diisocyanate, uretidiones of hexamethylene diisocyanate, uretidiones of isophorone diisocyanate and a diol, such as, ethylene glycol, the adduct of 3 molecules of hexamethylene diisocyanate and 1 molecule of water, allophanates, trimers and biurets of hexamethylene diisocyanate, allophanates, trimers and biurets of isophorone diisocyanate and the isocyanurate of hexane diisocyanate.

Tri-functional isocyanates also can be used, such as, Desmodur® N 3300, trimer of hexamethylene diisocyanate, Desmodur® 3400, trimer of isophorone diisocyanate, Desmodur® 4470 trimer of isophorone diisocyanate, these trimers are sold by Bayer Corporation. A trimer of hexamethylene diisocyanate sold as Tolonate® HDT from Rhodia Corporation is also suitable.

An isocyanate functional adduct can be used, such as, an adduct of an aliphatic polyisocyanate and a polyol. Also, any of the aforementioned polyisocyanates can be used with a polyol to form an adduct. Polyols, such as, trimethylol alkanes, particularly, trimethylol propane or ethane can be used to form an adduct.

The melamine crosslinking agents are generally partially alkylated melamine formaldehyde compounds and may be monomeric or polymeric or mixtures thereof. Some of the suitable monomeric melamines include low molecular weight melamines which contain, on an average, three or more methylol groups etherized with a $C_1$ to $C_5$ monohydric alcohol such as methanol, n-butanol, or isobutanol per triazine nucleus, and have an average degree of condensation up to about 2 and preferably in the range of about 1.1 to about 1.8, and have a proportion of mononuclear species not less than about 50 percent by weight. By contrast the polymeric melamines have an average degree of condensation of more than 1.9.

Some such suitable monomeric melamines include alkylated melamines, such as methylated, butylated, isobutylated melamines and mixtures thereof. Many of these suitable monomeric melamines are supplied commercially. For example, Cytec Industries Inc., West Patterson, N.J. supplies Cymel® 301 (degree of polymerization of 1.5, 95% methyl and 5% methylol), Cymel® 350 (degree of polymerization of 1.6, 84% methyl and 16% methylol), 303, 325, 327 and 370, which are all monomeric melamines. Suitable polymeric melamines include high amino (partially alkylated) melamine known as Resimene® BMP5503 (molecular weight 690, polydispersity of 1.98, 56% butyl, 44% amino), which is supplied by Solutia Inc., St. Louis, Mo., or Cymel®1158 provided by Cytec Industries Inc., West Patterson, N.J. Cytec Industries Inc. also supplies Cymel® 1130 @ 80 percent solids (degree of polymerization of 2.5), Cymel® 1133 (48% methyl, 4% methylol and 48% butyl), both of which are polymeric melamines.

If desired, appropriate catalysts may also be included in the activated compositions to accelerate the curing process of a potmix of the coating composition.

When the activated compositions include melamine as the crosslinking agent, it also preferably includes a catalytically active amount of one or more acid catalysts to further enhance the crosslinking of the components on curing. Generally, catalytically active amount of the acid catalyst in the coating composition ranges from about 0.1 percent to about 5 percent, preferably ranges from 0.1 percent to 2 percent, more preferably ranges from 0.5 percent to 1.2 percent, all in weight percent based on the weight of the binder. Some suitable acid catalysts include aromatic sulfonic acids, such as dodecylbenzene sulfonic acid, para-toluenesulfonic acid and dinonyinaphthalene sulfonic acid, all of which are either unblocked or blocked with an amine, such as dimethyl oxazolidine and 2-amino-2-methyl-1-propanol, n,n-dimethylethanolamine or a combination thereof. Other acid catalysts that can be used, such as phosphoric acids, more particularly, phenyl acid phosphate, benzoic acid, oligomers having pendant acid groups, all of which may be unblocked or blocked with an amine.

When the activated compositions include a polyisocyanate as the crosslinking agent, the coating composition preferably includes a catalytically active amount of one or more tin or tertiary amine catalysts for accelerating the curing process. Generally, catalytically active amount of the catalyst in the coating composition ranges from about 0.001 percent to about 5 percent, preferably ranges from 0.005 percent to 2 percent, more preferably ranges from 0.01 percent to 1 percent, all in weight percent based on the weight of the binder. A wide variety of catalysts can be used, such as, tin compounds, including dibutyl tin dilaurate and dibutyl tin diacetate; tertiary amines, such as, triethylenediamine. These catalysts can be used alone or in conjunction with carboxylic acids, such as, acetic acid. One of the commercially available catalysts, sold under the trademark, Fastcat® 4202 dibutyl tin dilaurate by Elf-Atochem North America, Inc. Philadelphia, Pa., is particularly suitable.

Organic Carrier Medium

The organic liquid carrier medium comprises an organic solvent or blend of solvents. The coating compositions contain about 5-95 percent, more typically 10-85 percent by weight of solvent and about 5-95 percent, more typically 15-90 percent by weight, of an organic liquid carrier (based on the weight of the coating composition). The selection of organic solvent depends upon the requirements of the specific end use application of the coating composition of this invention, such as the VOC (volatile organic content) emission requirements, the selected pigments, binder and crosslinking agents. Representative examples of organic solvents which are useful herein include alcohols, such as methanol, ethanol, n-propanol, and isopropanol; ketones, such as acetone, butanone, pentanone, hexanone, and methyl ethyl ketone, methyl isobutyl ketone, diisobutyl ketone, methyl amyl ketone; alkyl esters of acetic, propionic, and butyric acids, such as ethyl acetate, butyl acetate, and amyl acetate; ethers, such as tetrahydrofuran, diethyl ether, and ethylene glycol and polyethylene glycol monoalkyl and dialkyl ethers such as cellosolves and carbitols; and glycols such as ethylene glycol and propylene glycol and mixtures thereof, and aromatic hydrocarbon solvents, such as xylene, toluene.

Pigments

The coating composition containing the rheology control agent of this invention may be used as a base coat or as a pigmented mono-coat topcoat. Both of these compositions require the presence of pigments. Typically, a pigment-to-binder ratio of 0.1/100 to 200/100 is used depending on the color and type of pigment used. The pigments are formulated into mill bases by conventional procedures, such as, grinding, sand milling, ball milling, high speed mixing, attritor grinding and two or three roll milling. Generally, the mill base comprises pigment and a dispersant in a liquid carrier. The mill base is added in an appropriate amount to the coating composition with mixing to form a pigmented coating composition.

Any of the conventionally-used organic and inorganic pigments, such as, white pigments, like, titanium dioxide, color pigments, metallic flakes, such as, aluminum flake, special effects pigments, such as, coated mica flakes, coated aluminum flakes and the like, azo, anthraquinone, thioindigo, oxazine, quinacridone, lakes and toners of acidic dye stuffs, copper phthalocyanine and its derivatives, and various mixtures and modifications thereof and extender pigments can be used.

The coating composition containing the novel rheology control agent may be used as a primer, primer surfacer or sealer in which case typical pigments used in primers would be added, such as, carbon black, barytes, silica, iron oxide and other pigments that are commonly used in primers in a pigment-to-binder ratio of 10/100 to 300/100.

Coating Compositions and Additives to Improve Weatherability

The coating composition containing the novel rheology control agent of this invention can be used as a clear coat that is applied over a pigmented base coat that may a pigmented version of the composition of this invention or another type of a pigmented base coat. The clear coating can be in solution or in dispersion form.

Typically, a clear coating is applied over the base coating before the base coating is fully cured. This is a so called "wet-on-wet process". In this process, a base coating is applied to a substrate and flash dried and then the clear coating is applied and both layers are then fully cured either at ambient temperatures or cured by heating to elevated temperatures, for example, of 50° C. to 100° C. for 15 to 45 minutes to form a clear coat/base coat finish. When used in combination with a primer or primer-surfacer, the primer or primer-surfacer is also flash dried and then the base coating and clear coating are applied as above. This is a so-called "wet on wet on wet" process. The base coating and clear coating preferably have a dry coating thickness ranging from 25 to 75 microns and 25 to 100 microns, respectively.

When refinishing automobile and truck bodies, the original OEM topcoat is usually sanded and a primer or sealer coat applied and then a mono coat or a basecoat/clear coat is applied. These coatings are usually cured at ambient temperatures or at slightly elevated temperatures, such as, 40 to 100° C.

To improve the weathering properties of clear coatings, the coating composition contains about 0.1 to 5% by weight, based on the weight of the binder, of ultraviolet light absorbers. Typically useful ultraviolet light absorbers include hydroxyphenyl benzotriazols, such as, 2-(2-hydroxy-5-methylphenyl)-2H-benzotrazole, 2-(2-hydroxy-3,5-di-tert.amylphenyl)-2H-benzotriazole, 2[2-hydroxy-3,5-di(1,1-dimethylbenzyl)phenyl]-2H-benzotriazole, reaction product of 2-(2-hydroxy-3-tert.butyl-5-methyl propionate)-2H-benzotriazole and polyethylene ether glycol having a weight average molecular weight of 300, 2-(2-hydroxy-3-tert.butyl-5-iso-octyl propionate)-2H-benzotriazole; hydroxyphenyl s-triazines, such as, 2-[4((2,-hydroxy-3-dodecyloxy/tridecyloxypropyl)-oxy)-2-hydroxyphenyl]-4,6-bis(2,4-dimethylphenyl)-1,3,5-triazine, 2-[4(2-hydroxy-3-(2-ethylhexyl)-oxy)-2-hydroxyphenyl]-4,6-bis(2,4-dimethylphenyl)1,3,5-triazine, 2-(4-octyloxy-2-hydroxyphenyl)-4,6-bis(2,4-dimethylphenyl)-1,3,5-triazine; hydroxybenzophenone U.V. absorbers, such as, 2,4-dihydroxybenzophenone, 2-hydroxy-4-octyloxybenzophenone, and 2-hydroxy-4-dodecyloxybenzophenone.

Clear coating compositions of the novel coating composition also may contain about 0.1 to 5% by weight, based on the weight of the binder, of a di-substituted phenol antioxidant or a hydroperoxide decomposer. Typically useful antioxidants include tetrakis[methylene(3,5-di-tert-butylhydroxy hydrocinnamate)]methane, octadecyl 3,5-di-tert-butyl-4-hydroxyhydrocinnamate, tris(2,4-di-tert-butylphenyl) phosphite, 1,3,5-tris(3,5-di-tert-butyl-4-hydroxybenzyl)-1,3,5-triazine-2,4,6(1H,3H,5H)-trione and benzenepropanoic acid, 3,5-bis(1,1-dimethyl-ethyl)-4-hydroxy-C7-C9 branched alkyl esters. Typically useful hydroperoxide decomposers include Sanko® HCA (9,10-dihydro-9-oxa-10-phosphenanthrene-10-oxide), triphenyl phosphate and other organo-phosphorous compounds, such as, Irgafos® TNPP from Ciba Specialty Chemicals, Irgafos® 168, from Ciba Specialty Chemicals, Ultranox® 626 from GE Specialty Chemicals, Mark PEP-6 from Asahi Denka, Mark HP-10 from Asahi Denka, Irgafos® P-EPQ from Ciba Specialty Chemicals, Ethanox 398 from Albemarle, Weston 618 from GE Specialty Chemicals, Irgafos® 12 from Ciba Specialty Chemicals, Irgafos® 38 from Ciba Specialty Chemicals, Ultranox® 641 from GE Specialty Chemicals and Doverphos® S-9228 from Dover Chemicals.

Clear coating compositions containing the novel rheology control agent also may contain about 0.1-5% by weight, based on the weight of the binder, of hindered amine light stabilizers. Typically useful hindered amine light stabilizers include N-(1,2,2,6,6-pentamethyl-4-piperidinyl)-2-dodecyl succinimide, N(1 acetyl-2,2,6,6-tetramethyl-4-piperidinyl)-2-dodecyl succinimide, N-(2hydroxyethyl)-2,6,6,6-tetramethylpiperidine-4-ol-succinic acid copolymer, 1,3,5 triazine-2,4,6-triamine, N,N'''-[1,2-ethanediybis[[[4,6-bis[butyl(1,2,2,6,6-pentamethyl-4-piperidinyl)amino]-1,3,5-triazine-2-yl]imino]-3,1-propanediyl]]bis[N,N'''-dibutyl-N',N'''-bis(1,2,2,6,6-pentamethyl-4-piperidinyl)], poly-[[6-[1,1,3,3-tetramethylbutyl)-amino]-1,3,5-trianzine-2,4-diyl][2,2,6,6-tetramethylpiperidinyl)-imino]-1,6-hexane-diyl[(2,2,6,6-tetramethyl-4-piperidinyl]imino]), bis(2,2,6,6-tetramethyl-4-piperidinyl)sebacate, bis(1,2,2,6,6-pentamethyl-4-piperidinyl)sebacate, bis(1-octyloxy-2,2,6,6-tetramethyl-4-piperidinyl)sebacate, bis(1,2,2,6,6-pentamethyl-4-piperidinyl)[3,5bis(1,1-dimethylethyl-4-hydroxy-phenyl) methyl]butyl propanedioate, 8-acetyl-3-dodecyl-7,7,9,9,-tetramethyl-1,3,8-triazaspiro(4,5)decane-2,4-dion, dodecyl/tetradecyl-3-(2,2,4,4-tetramethyl-2I-oxo-7-oxa-3,20-diazaldispiro(5.1.11.2)henicosan-20-yl)propionate.

Other Additives

In addition, the coating composition containing the novel rheology control agent may also contain a variety of other optional compatible ingredients, including fillers, plasticizers, antioxidants, surfactants and flow control agents.

For example, such coating compositions may contain 0.1 to 30% by weight, based on the weight of the binder, of acrylic NAD (non-aqueous dispersed) resins. These NAD resins typically are high molecular weight resins having a crosslinked acrylic core with a Tg between 20 to 100° C. and attached to the core are low Tg stabilizer segments. A description of such NADs is found in Antonelli et al. U.S. Pat. No. 4,591,533 and in Barsotti et al. U.S. Pat. No. 5,763,528 which patents are hereby incorporated by reference.

Also, such coating compositions may include other conventional formulation additives known to those skilled in the art, such as, wetting agents, leveling and flow control agents, for example, Resiflow®S (polybutylacrylate), BYK® 320 and 325 (high molecular weight polyacrylates), BYK® 347 (polyether-modified siloxane), rheology control agents, such as, fumed silica, defoamers, surfactants and emulsifiers to help stabilize the composition. Other additives that tend to improve mar resistance can be added, such as, silsesquioxanes and other silicate-based micro-particles.

One particularly useful additive is a blend of the novel rheology control agent and finely divided silica in a weight ratio of 0.1:1 to 1:0.1. Other particularly useful additive is a blend of the novel rheology control agent and bis-urea crystals as mentioned in U.S. Pat. No. 4,311,622 in a weight ratio of 0.1:1 to 1:0.1.

The rheology control agent may be incorporated into one of the components of a typical two component (2K) coating composition. For example, in a typical 2K acrylic/isocyanate system, the rheology control agent may be incorporated with the acrylic polymer component which is then blended with the isocyanate component just before application.

Application

The coating composition can be applied by conventional techniques, such as, spraying, electrostatic spraying, dipping, brushing, and flow coating. Spraying and electrostatic spraying are preferred methods of application.

In OEM applications, the composition is typically baked at 60°-150° C. for about 15-30 minutes to form a coating about 25 to 75 microns thick. When the composition is used in a basecoat/clearcoat system, the basecoat may be dried to a tack-free state and cured or preferably flash dried for a short period before the clearcoat is applied (wet-on-wet). The basecoat/clearcoat finish is then baked as mentioned above to provide a dried and cured finish. The novel coating composition can also be formulated with the 3-wet (wet-on-wet-on-wet) coating process, where the primer, basecoat and clearcoat are applied to a substrate in sequential steps without baking process in between each layer. The final three layer coated substrate coating is then baked to provide a dried and cure finish. The novel rheology control agent when formulated with a composition containing a polyisocyanate crosslinking agent is particularly useful in a non-baking refinish system, as will be readily appreciated by those skilled in the art.

If used in refinishing vehicles, the base coat may be allowed to "dry to the touch" at ambient temperature conditions or under warm air before the clear coating is applied. The base coating and clear coating preferably have a dry coating thickness ranging from 25 to 75 microns and 25 to 100 microns, respectively. These coatings are usually cured at ambient temperatures or at slightly elevated temperatures, such as, 40 to 100° C.

The coating composition is particularly useful for the repairing and refinishing of automobile bodies and truck bodies and parts, as a clear coat, pigmented base coat, as a primer surfacer or primer filler. The novel composition has uses for coating any and all items manufactured and painted by automobile sub-suppliers, frame rails, commercial trucks and truck bodies, including but not limited to beverage bottles, utility bodies, ready mix concrete delivery vehicle bodies, waste hauling vehicle bodies, and fire and emergency vehicle bodies, as well as any potential attachments or components to such truck bodies, buses, farm and construction equipment, truck caps and covers, commercial trailers, consumer trailers, recreational vehicles, including but not limited to, motor homes, campers, conversion vans, vans, large commercial aircraft and small pleasure aircraft, pleasure vehicles, such as, snow mobiles, all terrain vehicles, personal watercraft, motorcycles, and boats. The novel composition also can be used as a coating for industrial and commercial new construction and maintenance thereof; cement and wood floors; walls of commercial and residential structures, such as, office buildings and homes; amusement park equipment; concrete surfaces, such as parking lots and drive ways; asphalt and concrete road surface, wood substrates, marine surfaces; outdoor structures, such as bridges, towers; coil coating; railroad cars; printed circuit boards; machinery; OEM tools; signs; fiberglass structures; sporting goods; and sporting equipment.

The present invention is further defined in the following Examples. It should be understood that these Examples are given by way of illustration only. From the above discussion and these Examples, one skilled in the art can ascertain the essential characteristics of this invention, and without departing from the spirit and scope thereof, can make various changes and modifications of the invention to adapt it to various uses and conditions. As a result, the present invention is not limited by the illustrative examples set forth herein below, but rather is defined by the claims contained herein below The following Examples illustrate the invention. All parts and percentages are on a weight basis unless otherwise indicated. All molecular weights disclosed herein are determined by LC/MS (Liquid Chromatography/Mass Spectroscopy) and/or GPC (gel permeation chromatography) using a polystyrene standard.

EXAMPLES

Example 1

The following show the preparation of rheology control agents:

General Preparation Procedure for Compounds Having Above Formulas (IV)-(XVI):

The aminoalcohol (4.16 mol) and chloroform (800 g) were charged into a 2 L flask, under $N_2$ protection. The diisocyanate (0.42 mol) was added over 2 hours at 0° C. into the flask with vigorous stirring, followed by continued stirring at RT (room temperature) for 2 hours. In most cases the precipitation of a white solid was observed. The solid was purified through repeated filtration using acetonitrile as a wash solvent. In cases without solid precipitation addition of acetonitrile resulted in solid precipitation. The solid was dried under vacuum overnight at RT. In general LC/MS (Liquid Chromatography/Mass Spectroscopy) result showed purity of >94% with small amounts of higher molecular weight impurities.

Under $N_2$ protection, the isolated white solid (0.26 mol) was added into a 1000 ml flask followed by 500 g of N-methylpyrrolidone and heated at 90° C., under stirring, to form a white suspension. Dibutyltin dilaurate (~0.1% mole/mole) was added to this reaction mixture. The mono-isocyanate component (1 mol) was charged dropwise from an addition funnel into the reaction mixture. The temperature of the reaction was raised to 110° C. The reaction mixture becomes homogeneous. After complete addition the reaction mixture was maintained at 110° C. for additional 2 hrs. After cooling to RT the product is precipitated and Table:

| Compound | Yield | Aminoalcohol | Diisocyanate |
|---|---|---|---|
| (IV) | 93.9% | 2-(2-aminoethoxy)ethanol | 1,12-diisocyanatododecane |
| (V) | 87.4% | ethanol amine | 1,6-hexamethylene diisocyanate |
| (VI) | 90.1% | 2-(2-aminoethoxy)ethanol | 1,4-diisocyanatobutane |
| (VII) | 84.3% | 2-(2-aminoethoxy)ethanol | 1,6-hexamethylene diisocyanate |
| (VIII) | 67.0% | 2-(2-aminoethoxy)ethanol | 1,8-diisocyanatooctane |
| (IX) | 76.4% | 3-amino-1-propanol | 1,8-diisocyanatooctane |
| (X) | 87.1% | ethanolamine | 1,8-diisocyanatooctane |
| (XI) | 42.3% | ethanolamine | 1,5-diisocyanato-2-methylpentane |
| (XII) | 86.6% | 3-amino-1-propanol | 1,6-hexamethylene diisocyanate |
| (XIII) | 90.9% | 3-amino-1-propanol | 1,4-diisocyanatobutane |
| (XIV) | 83.0% | ethanolamine | 1,4-diisocyanatobutane |
| (XV) | 90.8% | 3-amino-1-propanol | 1,12-diisocyanatododecane |
| (XVI) | 93.2% | ethanolamine | 1,12-diisocyanatododecane |

General Preparation Procedure for Compounds Having Above Formulas (XXVI)-(XXIX):

The diamine 2-methyl-1,5-pentanediamine (3.0 g) was added into a 100 ml flask, then diluted with 100 ml CHCl$_3$. To this mixture was added 0.054 mol monoisocyanate under constant agitation at R.T. After about 18 hrs of mixing at R.T. a clear and homogeneous reaction mixture was observed. The mixture was poured into ethyl ether and the obtained solids were filtered and further rinsed with ethyl ether and dried under vacuum at R.T. A white solid was obtained. The product was analyzed using LC/MS spectroscopy.

| Compound | Isolated Yield | Monoisocyanate |
|---|---|---|
| (XXVI) | 98% | Pentyl isocyanate |
| (XXVII) | ~100% | Dodecyl isocyanate |
| (XXVIII) | 96% | Hexyl isocyanate |
| (XXIX) | ~100% | Octyl isocyanate |

General Preparation Procedure for Compound Having Above Formula (XVII):

All operation is carried out under a dry N$_2$ atmosphere. Step 1: cyclohexyl isocyanate (0.11 mol) was added dropwise into a flask containing ethanolamine (0.11 mol) and toluene at 0° C. At the end of the addition, the reaction mixture was allowed to warm up to room temperature and stir for 2 hours. The product is then collected by washing with ether and dried in a vacuum oven at RT overnight. The sample is then submitted for NMR and LC/MS analysis. Step 2: The product from step 1 is dissolved in 160 mL acetonitrile under N$_2$. The flask is then heated in an oil bath at 70° C. with stirring. 48 mg of dibutyltindilaurate is then added into the reaction mixture and the vial containing the catalyst was rinsed with a small amount of toluene to ensure complete transfer of the catalyst. In the drybox, 13.78 g of HDI (hexamethylene diisocyanate) is mixed with 80 mL of acetonitrile and then transferred into an addition funnel and added to the reaction mixture dropwise. At the end of the addition, the reaction temperature is raised to 80° C. and stirred for another 4 hours. The reaction mixture is then cooled to room temperature and the solid is collected by filtration and washed several times with acetonitrile. The product is then dried in vacuum oven at room temperature overnight. Analysis by LC/MS confirms the formation of the product with a MW of 541.8, the compound is essentially ~100% pure.

General Preparation Procedure for Compounds Having Above Formulas (XXIII)-(XXIV):

75.0 g serinol and 400 g of chloroform plus ~20 ml acetonitrile were charged into a 500 ml flask, under N$_2$ protection and vigorous stirring. To this 13.85 g hexamethylene diamine diisocyanate was added drop by drop (slowly) over 2 hrs. The flask was immersed into an ice bath during the addition. After the complete addition of hexamethylene diamine diisocyanate, a white precipitation is formed. The reaction was maintained at RT for one additional hour. The conversion was assessed using LC/MS analysis indicating complete conversion of starting materials. The solid material was filtered with a medium size filter followed by repeated acetonitrile rinsing followed by repeated methanol rinsing. The solid was dried under vacuum overnight at RT. to obtain 30.89 g of a white solid. The yield for this reaction is ~100%.

In the next step 10.0 g of the dried product of the bis-urea tetraol was added into a 250 ml flask followed by 150 g of NMP. Under N$_2$ protection, the flask was immersed and stirred in an oil bath at 110° C. From a drybox, 0.171 mol of the monoisocyanate was transferred into an additional funnel set on the top of the reaction flask. Next, 0.072 g of Dibutyltin dilaurate (Aldrich) was added into the reaction mixture, the monoisocyanate was added dropwise into the flask. After the addition of ¼ of the monoisocyanate, the mixture became clear and homogeneous. After complete addition the reaction was maintained at 110° C. for additional 3 hrs. LC/MS analysis indicates that all starting materials are consumed. The mixture was dispersed and rinsed repeatedly using acetonitrile. The white solid was filtered and dried under vacuo overnight.

Typical yields for these reactions are 88-95%.

| Compound | Monoisocyanate |
|---|---|
| (XXIII) | Hexyl isocyanate |
| (XXIV) | Cyclohexyl isocyanate |

General Preparation Procedure for Compounds Having Above Formulas (XXX-XXXIII):

The following reaction was carried out under a blanket of nitrogen and vigorous stirring. 19.8 mmol of diacyl chloride in 10 mL of toluene was added dropwise into a flask containing 79.3 mmol N-octyl-N-(2-hydroxyethyl) urea and 1.76 g calcium hydroxide mixture in 10 mL of 1M LiCl/NMP. The flask was held at about 5° C. during the addition. The reaction mixture was allowed to warm to room temperature and stirred for 4 hrs. The product was collected by filtration and subsequently drying under vacuum. Typical yields for these reactions are 50-95%.

| Compound | Diacyl chloride | Monoisocyanate |
|---|---|---|
| (XXX) | Malonyl chloride | Octyl isocyanate |
| (XXXI) | Succinyl chloride | Octyl isocyanate |
| (XXXII) | Adipoyl chloride | Octyl isocyanate |
| (XXXIII) | Glutaryl chloride | Octyl isocyanate |

General Preparation Procedure for Compounds Having Above Formulas (XXXIV-XXXV):

The following reaction was carried out under a blanket of nitrogen and vigorous stirring. 22.8 mmol of diacyl chloride in 10 mL of toluene was added dropwise into a flask containing 45.6 mmol N-cyclohexyl-N-(2-hydroxyethyl)urea and 1.76 g calcium hydroxide mixture in 90 mL of 1M NMP. The flask was held at about 5° C. during the addition. The flask was equipped with a stirrer. The reaction mixture was allowed to warm to room temperature and stirred for 4 hrs. The product was collected by filtration and subsequently drying under vacuum. Typical yields for these reactions are 30-75%.

| Compound | Diacyl chloride | Monoisocyanate |
|---|---|---|
| (XXXIV) | Adipoyl chloride | Cyclohexyl isocyanate |
| (XXXV) | Succinyl chloride | Cyclohexyl isocyanate |

General Preparation Procedure for Compounds Having Above Formulas (XVIII-XXII):

The following reaction was carried out under a blanket of nitrogen and vigorous stirring. 0.15 mol of 1,6-diisocyanato hexane was added dropwise into a flask containing 1.50 mol amino alcohol in 200 mL of anhydrous chloroform. The flask was held at about 10° C. during the addition. The reaction mixture was allowed to warm to room temperature and stirred for overnight. The product was collected by filtration and subsequently dried under vacuum to give a solid. Typical yields for these reactions are over 90%.

The second step reaction was carried out under a blanket of nitrogen. 68.8 mmol of acyl chloride in 10 mL of N-methylpyrrolidone (NMP) was added dropwise into a flask containing 17.2 mmol of the above intermediate and 5.10 g calcium hydroxide in 48.3 mL of 1M LiCl/NMP. The flask was held at about 5° C. during the addition. The flask was equipped with a stirrer. The reaction mixture was allowed to warm to room temperature and stirred overnight. The reactions were monitored with NMR analysis and the reaction was considered completion when the chemical shifts of protons and carbons that are adjacent to isocyanate disappeared. The product was collected by filtration and subsequently dried under vacuum. Typical yields for these reactions are over 50-90%.

| Compound | Acid chloride |
|---|---|
| (XVIII) | 2-Ethylhexanoyl chloride |
| (XIX) | Valeryl chloride |
| (XX) | Isovaleryl chloride |
| (XXI) | t-Butylacetyl chloride |
| (XXII) | Palmitoyl chloride |

General Preparation Procedure for Compounds Having Above Formula (XLIII):

The following reaction was carried out under a blanket of nitrogen and vigorous stirring. 52.47 g (0.4 mol) L-leucine, 18.02 g (0.2 mol) diethylene glycol methyl ether, and 95.11 g (0.5 mol) p-toluenesulfonic acid were added to a 3-neck round bottom flask with a dean stark trap with a reflux condenser on the top. 800 mL of dry benzene was added to the mixture. The reaction temperature was maintained at 80° C. for 5 hrs. 1.0 M NaHCO$_3$ solution was added into the stirred mixture slowly until no bubbles were formed. After extraction, the organic layer was dried over MgSO$_4$, followed by filtration. The product was subsequently dried under vacuum to give a yellowish oil (56.52 g, 89.3% yield).

The second step reaction was carried out under a blanket of nitrogen and vigorous stirring. 7.92 g (51.0 mmol) of octylisocyanate in 20 mL of toluene was added dropwise into a flask containing 9.02 g of the above intermediate mixture in 80 mL of toluene. The flask was held at about 10° C. during the addition. The reaction mixture was allowed to warm to room temperature and stirred overnight. The product was collected by filtration and subsequently dried under vacuum to give a white powder (8.90 g, 94.7% yield).

General Preparation Procedure for Compounds Having Above Formula (XLIV):

The ethanol amine (4.16 mol) and chloroform (800 g) were charged into a 2 L flask, under N$_2$ protection. The hexalene diisocyanate (0.42 mol) was added over 2 hours at 0° C. into the flask with vigorous stirring, followed by continued stirring at RT (room temperature) for 2 hours. Precipitation of a white solid was observed. The solid was purified through repeated filtration using acetonitrile as a wash solvent. The solid was dried under vacuum overnight at RT. LC/MS result showed purity of >94% with small amounts of higher molecular weight impurities.

In a 500 mL flask, 25.4 g (87.5 mmol) of above isolated white solid was dissolved in NMP at 100° C., then 150.0 g (1.31 mol) of ε-caprolactone was added. The temperature was then raised to 100° C. for 1 hr, then ~0.4 g of dibultyltin dilaurate was added. The reaction was maintained for ~60 hrs at 110° C. Then the heating was withdrawn. The entire mixture remained as brownish liquid with increased viscosity. ~419 g of orange color haze liquid was obtained. GPC analysis with THF and polystyrene as standards confirmed the Mw ~1,400. The calculated active solid content was ~29% (w/M$_n$).

Supporting Analytical Results

LC/MS (Liquid Chromatography/Mass Spectroscopy) analyses were performed on a Waters Alliance 2790 LC equipped with a MS (ESI) interface. Column: Zorbax SB-C18, 2.1×150 mm at 60° C.; Solvents: A=water+0.05% TFA, B=acetonitrile+0.05% TFA. Conditions: 95% A 0% A over 4.5 min, hold 3.5 minutes, then return to initial conditions after 42 min; Wavelength: 220 nm; Flow rate: 0.8 mL/min. NMR (Nuclei Magnetic Resonance) analysese were performed on a Bruker 500 MHz instrument. Solvents used to dissolve the samples are A=DMSO-d6 (dimethyl sulfoxide), B=DMF-d7 (dimethyl formamide), C=MeOD-d4 (methanol).

| Sample | LC/MS (M+1) | Solvent | NMR(ppm) 1H NMR(500MHz) | 13C NMR(125MHz) |
|---|---|---|---|---|
| IV | 713.3 | A | 1.20(m); 1.25; 1.35(m); 1.52(m); 1.54(m); 1.65(m); 1.67(m); 1.74(m); 1.76(m); | 24.89; 25.59; 26.76; 29.11; 29.28; 29.31; 30.35; 33.01; 50.01; |

-continued

| Sample | LC/MS (M+1) | Solvent | 1H NMR(500MHz) | 13C NMR(125MHz) |
|---|---|---|---|---|
| | | | 2.97(m); 3.02; 3.14(m); 3.26(m); 3.40(m); 3.55(m); 4.04(m); 5.59(m); 5.67(m); 6.62 | 63.34; 69.17; 70.58; 155.73; 158.54 |
| V | 541.3 | A | 1.11(m); 1.20(m); 1.25(m); 1.36(m); 1.52(m); 1.54(m); 1.65(m); 1.67(m); 1.75(m); 1.92(m); 2.02; 2.17(m); 2.70; 2.97(m); 3.02; 3.19(m); 3.26(m); 3.91(m); 5.64(m); 5.70(m); 6.53 | 24.90; 25.58; 26.51; 30.30; 33.02; 39.57; 39.83; 50.01; 63.68; 155.78; 158.50 |
| VI | 601.3 | A | 1.12(m); 1.21(m); 1.36(m); 1.51(m); 1.54(m); 1.65(m); 1.67(m); 1.75(m); 1.77(m); 2.88; 2.99(m); 3.15(m); 3.27(m); 3.42(m); 3.56(m); 4.04(m); 5.52; 5.62; 6.43 | 24.83; 25.59; 27.96; 32.98; 39.75; 50.08; 63.40; 69.23; 70.63; 155.76; 158.62 |
| VII | 629.3 | A | 1.12(m); 1.21(m); 1.26; 1.37(m); 1.52(m); 1.66(m); 1.76(m); 2.87; 2.98(m); 3.15(m); 3.28(m); 3.42(m); 3.56(m); 4.05(m); 5.52; 5.60; 6.42 | 24.83; 25.59; 26.53; 30.32; 32.98; 39.89; 50.09; 63.41; 69.24; 70.64; 155.75; 158.63 |
| VIII | 657.4 | A | 1.12(m); 1.21(m); 1.25; 1.37(m); 1.53(m); 1.66(m); 1.76(m); 2.87; 2.98(m); 3.15(m); 3.28(m); 3.42(m); 3.56(m); 4.05(m); 5.52; 5.59; 6.42 | 24.83; 25.59; 26.73; 29.07; 30.34; 32.98; 50.08; 63.40; 69.23; 70.64; 155.90; 158.75 |
| IX | 597.3 | A | 1.12(m); 1.21(m); 1.26; 1.37(m); 1.52(m); 1.66(m); 1.75(m); 2.88; 2.98(m); 3.05(m); 3.27(m); 3.96(m); 5.46; 5.52; 6.30 | 24.84; 25.60; 26.73; 29.07; 30.36; 30.41; 33.03; 37.04; 39.95; 50.04; 62.18; 155.91; 158.67 |
| X | 569.3 | A | 1.12(m); 1.21(m); 1.26; 1.37(m); 1.52(m); 1.66(m); 1.76(m); 2.88; 2.98(m); 3.20(m); 3.28(m); 3.93(m); 5.56; 5.59; 6.32 | 24.83; 25.59; 26.73; 29.06; 30.31; 33.00; 39.68; 39.99; 50.07; 63.77; 155.82; 158.55 |
| XI | 541.3 | | NA | NA |
| XII | 569.3 | A | 1.12(m); 1.21(m); 1.26; 1.37(m); 1.52(m); 1.65(m); 1.75(m); 2.86; 2.98(m); 3.05(m); 3.27(m); 3.95(m); 5.47; 5.51; 6.29 | 24.84; 25.60; 26.53; 30.34; 30.41; 33.03; 37.04; 39.90; 50.04; 62.18; 156.01; 158.66 |
| XIII | 597.3 | A | 1.20(m); 1.36; 1.53(m); 1.65(m); 1.75(m); 2.98; 3.03; 3.26(m); 3.95(m); 5.61; 6.52 | 24.83; 25.52; 27.89; 30.28; 32.98; 36.84; 39.59; 49.90; 61.99; 155.83; 158.52 |
| XIV | 513.3 | A | 1.20(m); 1.36(m); 1.53(m); 1.65(m); 1.75(m); 2.98(m); 3.02; 3.19(m); 3.27(m); 3.91(m); 5.65(m); 5.72(m); 6.55 | 24.90; 25.58; 27.92; 33.02; 39.56; 39.67; 50.00; 63.67; 155.77; 158.49 |
| XV | 653.3 | A | 1.18(m); 1.25; 1.36v(m); 1.52(m); 1.64(m); 1.75(m); 2.97(m); 3.02; 3.25(m); 3.94(m); 5.56; 5.59; 6.50 | 24.90; 25.59; 26.76; 29.11; 29.27; 29.31; 30.35; 30.37; 33.05; 36.90; 49.97; 62.07; 156.01; 158.59 |
| XVI | 625.3 | A | 1.18(m); 1.25; 1.36(m); 1.53(m); 1.66(m); 1.75(m); 2.97(m); 3.02; 3.19(m); 3.26(m); 3.91(m); 5.63(m); 5.69(m); 6.52 | 24.90; 25.58; 26.76; 29.11; 29.28; 29.31; 30.33; 33.02; 39.55; 39.87; 50.01; 63.68; 155.78; 158.49 |
| XVIII | N/A | B | 0.82(m); 1.24(m); 1.37(m); 1.51(m); 2.25(m); 3.03(m); 3.30(m); 4.03(m); 7.32(m); 7.37(m) | 11.35; 13.53; 22.40; 25.14; 29.20; 29.38; 29.53; 29.70; 29.87; 31.41; 40.44; 46.86; 63.57; 159.50; 175.60 |
| XIX | N/A | B | 1.02(m); 1.44(m); 1.54(m); 1.68(m); 2.52(m); 3.13(m); 3.20(m); 3.50(m); 4.18(m); 7.58(m); 7.67(m) | 13.56; 22.15; 27.00; 33.65; 38.57; 63.95; 159.82; 173.49 |

-continued

| Sample | LC/MS (M+1) | Solvent | 1H NMR(500MHz) | 13C NMR(125MHz) |
|---|---|---|---|---|
| XX | N/A | B | 1.05(m); 1.45(m); 1.54(m); 2.38(m); 3.13(m); 3.23(m); 3.50(m); 4.18(m); 7.60(m); 7.67(m) | 22.13; 25.54; 26.99; 38.60; 40.46; 42.99; 63.86; 159.83; 172.7. |
| XXI | N/A | B | 0.95(m); 1.25(m); 1.35(m); 2.20(m); 3.02(m); 3.28(m); 3.98(m); 4.34(m); 7.35(m); 7.43(m) | 29.17; 35.45; 39.41; 47.17; 63.44; 159.57; 171.78 |
| XXIII | 971.8 | A | 0.85(m); 1.25; 1.40; 2.69; 2.97(m); 3.02; 3.94; 5.60; 5.79(m); 6.65 | 14.04; 22.29; 26.54; 26.62; 28.88; 29.00; 29.77; 30.24; 31.53; 39.80; 40.94; 48.91; 63.82; 156.37; 157.91 |
| XXIV | 851.5 | A | 1.23(m); 1.28; 1.37(m); 1.53(m); 1.67(m); 1.76(m); 2.99(m); 3.14(m); 3.28(m); 3.95; 5.64(m); 5.84(m); 6.57 | 24.73; 24.88; 25.54; 26.50; 30.19; 32.98; 33.64; 39.80; 40.46; 48.90; 50.09; 63.76; 155.67; 157.99 |
| XXVI | 343.3 | N/A | N/A | N/A |
| XXVII | 539.3 | N/A | N/A | N/A |
| XXVIII | 371.4 | A | 0.80(m); 0.86(m); 1.00(m); 1.25; 1.34(m); 1.46(m); 2.77(m); 2.95(m); 3.32; 5.71(m); 5.76(m) | 6.16; 13.87; 14.87; 17.58; 22.06; 26.03; 27.54; 29.99; 31.02; 31.15; 33.26; 45.19; 57.23; 80.67; 158.07; 158.17; 189.33 |
| XXIX | 427.3 | N/A | N/A | N/A |
| XXX | N/A | B | 1.02(m); 1.41(br); 1.55(m); 3.13(m); 3.22(m); 3.36(m); 3.63(m); 4.38(m); 5.87(m); 7.34(m); 7.51(m) | N/A |
| XXXI | N/A | B | 0.84(m); 1.23(br); 1.38(m); 2.69(s); 3.05(m); 3.17(m); 3.30(m); 3.46(m); 4.02(m); 5.88(m); 7.28(m); 7.35(m) | N/A |
| XXXII | N/A | B | 1.01(m); 1.42(br); 1.58(m); 1.79(m); 2.57(m); 3.13(m); 3.23(m); 3.50(m); 4.18(m); 4.34(m); 7.49(m); 7.56(m) | N/A |
| XXXIII | N/A | B | 0.84(m); 1.24(m); 1.38(m); 1.84(m); 2.42(m); 3.03(s); 3.31(m); 4.02(m); 4.15(m); 7.26(m); 7.38(m) | N/A |
| XXXIV | N/A | B | 1.36(m); 1.79(m); 2.57(s); 3.13(m); 3.48(m); 3.67(m); 4.19(m); 7.46(m); 7.61(m) | 24.39; 24.78; 25.93; 33.66; 38.49; 48.13; 63.98; 159.08; 173.31 |
| XXXV | N/A | B | 1.35(m); 1.89(m); 2.89(s); 3.13(m); 3.49(m); 3.67(m); 4.19(m); 7.45(m); 7.63(m) | 24.80; 25.78; 29.26; 33.60; 38.39; 48.05; 64.27; 159.02; 172.47 |
| XLIII | 627.5 | C | 0.91(m); 0.96(m); 1.33(br); 1.47(m); 1.57(m); 1.76(m); 3.11(m); 4.16(m); 4.30(m) | N/A |

Example 2

Evaluation of Rheology Control Agents in Coating Compositions

The above prepared rheology control agents were tested for rheological activity in a liquid organic resin coating composition. A high Tg acrylic resin (A), a hyperbranched polyester resin (B), and a low M.W. polyester resin (C) were used to evaluate these reagents. The organic resin systems were combined with 1-4% of the rheology control agent and diluted with an indicated amount of solvent. After mixing vigorously, the mixture was checked for gelation/viscosity increase after certain times by inverting the container. The scale of the rheology activity testing is based on a rating scale from 1-5: 1=the content will flow immediately, viscosity is the same as paint resin, 2=the content will flow immediately, but viscosity is higher than paint resin, 3=the content will flow between 2 to 100 seconds, 4=the content will flow after 10 seconds, 5=mixture is not flowing at all.

TABLE 1

| Test Compositions | Compound (Rheology Agent) | Resin Code | LiCl % | Solid wt % Rheology Agent | Initial Gel Rating (5 min) | Gel Rating after 2 hours | Gel Rating after 24 hours |
|---|---|---|---|---|---|---|---|
| 1 | XIX | A | 1.2 | 2.0% | 1 | 2 | 2 |
| 2 | XIX | C | 1.2 | 2.0% | 1 | 4 | 4 |
| 3 | XX | A | 1.5 | 2.0% | 1 | 4 | 4 |
| 4 | XX | C | 1.5 | 2.0% | 2 | 3 | 3 |
| 5 | XXI | A | 1.5 | 2.0% | 1 | 2 | 2 |
| 6 | XXII | A | 1.5 | 2.0% | 1 | 2 | 2 |
| 7 | XXII | C | 1.5 | 2.0% | 1 | 1 | 2 |
| 8 | XXIII | A | 0 | 2.0% | 2 | 2 | 2 |
| 9 | XXX | A | 2.5 | 2.0% | 2 | 2 | 2 |
| 10 | XXIX | B | 2.1 | 2.0% | 1 | 2 | 2 |
| 11 | XXXI | A | 2.5 | 2.0% | 2 | 3 | 2 |
| 12 | XXXI | B | 2.5 | 2.0% | 2 | 2 | 2 |
| 13 | XXXII | B | 2.5 | 2.0% | 1 | 1 | 3 |
| 14 | XXXIII | A | 2.3 | 2.0% | 5 | 5 | 5 |
| 15 | XXXIII | B | 2.3 | 2.0% | 3 | 4 | 5 |
| 16 | XXXII | A | 2.5 | 2.0% | 1 | 4 | 5 |
| 17 | XXXV | A | 2.3 | 2.0% | 1 | 2 | 2 |
| 18 | XXXV | B | 2.3 | 2.0% | 1 | 2 | 2 |
| 19 | XLIII | A | 2.1 | 1.0% | 3 | 4 | 4 |
| 20 | XLIII | B | 2.1 | 1.0% | 1 | 5 | 5 | the amount of resin used in each case is 5.0 g.

The above gel rating results show that a small amount (1-4% by wt.) of the rheology control agents of this invention are able to thicken coating compositions containing conventional binders used in coating compositions.

The following Table 2 shows gel test results where compositions were evaluated of a high Tg (glass transition temperature) acrylic resin A and a hyperbranched polyester resin B with rheology control agents of this invention in the presence 3% by wt. of LiCl.

TABLE 2

| | | SCA % | | Resin A | | Resin B | |
| Test Composition | Compound | in LiCl/NMP | LiCl % | SCA % | Gel Time | SCA % | Gel Time |
|---|---|---|---|---|---|---|---|
| 21 | (XIV) | 42.2% | 3.0% | 2.0% | 13'00" | 2.0% | 5'00" |
| 22 | (XIII) | 16.6% | 3.0% | 2.0% | 1'30" | 2.0% | 1'10" |
| 23 | (V) | 25.0% | 3.0% | 2.0% | 4'10" | 2.0% | 3'10" |
| 24 | (XII) | 18.5% | 3.0% | 2.0% | 1'30" | 2.0% | 50" |
| 25 | (VII) | 36.8% | 3.0% | 2.0% | ~15 hrs | 2.0% | ~10 hrs |
| 26 | (X) | 17.1% | 3.0% | 2.0% | 2'30" | 2.0% | 2'00" |
| 27 | (IX) | 18.2% | 3.0% | 2.0% | 50" | 2.0% | 45" |
| 28 | (VIII) | 37.0% | 3.0% | 2.0% | 10'00" | 2.0% | 8'30" |
| 29 | (XVI) | 20.7% | 3.0% | 2.0% | 20" | 2.0% | 1'20" |
| 30 | (XVI) | 13.1% | 3.0% | 2.0% | 12" | 2.0% | Not Gel |
| 31 | (IV) | 29.2% | 3.0% | 2.0% | 35" | 2.0% | 20" |
| 32 | (XXIII) | 35.1% | 3.0% | 2.0% | 30" | 2.0% | 1'10" |
| 33 | (XIV) | 25.0% | 3.0% | 2.0% | 8'00" | 2.0% | 5'00" |

* SCA % in LiCl/NMP is the solid weight % of rheology control agent in the LiCl/NMP solution; LiCl % is the solid weight % of LiCl in the LiCl/NMP solution. SCA % is the weight % of rheology control agent in overall solid binder resin.

The above test results shown in Table 2 show that 2 wt % of the rheology control agent in this invention thicken binder resin such as resins A and B effectively. Gel activity depends on the structure of a rheology control agent and the resin used in the composition that is being tested. Although compound (XV) did not gel resin B (hyperbranched polyester resin), it did increase the viscosity of the composition.

The examples in Table 3 were prepared by incorporating the example compound at 50° C. into methylamyl ketone, this dispersion was added to the resin, in this case resin B. The mixture was agitated under shear at elevated temperature (~40-50° C.). After this, the sample was allowed to cool down to RT under continued shear. Sample composition: 1.0 wt % example compound in total resin solid at 45.0 wt % total solid in wet sample.

TABLE 3

| Test Composition | Compound | SCA % | Brookfield ratio of shear rates: 0.5 rpm/150 rpm |
|---|---|---|---|
| 34 | (XXVI) | 1.0% | 8.1 |
| 35 | (XXIII) | 1.0% | 9.2 |
| 36 | (XXIV) | 1.0% | 13.9 |
| 37 | (XXII) | 1.0% | 17.5 |

TABLE 3-continued

| Test Composition | Compound | SCA % | Brookfield ratio of shear rates: 0.5 rpm/150 rpm |
|---|---|---|---|
| 38 | (XXXV) | 1.0% | 3.2 |
| 39 | (XXXII) | 1.0% | 7.9 |
| 40 | (XXXIII) | 1.0% | 3.1 |
| 41 | (XXXI) | 1.0% | 4.7 |

SCA % is the solid weight % of rheology control agent in overall binder resin.

The brookfield ratio (floc index) indicates that these examples demonstrated shear thinning properties with high viscosity at low shear rate and low viscosity at high shear rate.

The results in Tables 1-3 indicate that the addition of the rheology control additives of this invention, even at these low levels, to typical binder resin systems results in the formation of a gel or a solution with increased viscosity and therefore, changes the rheological behavior of these systems dramatically. In Table 3 the change of the observed viscosity at different shear ratios also supports the proposed rheological modification of the binder resin.

Example 3

The following lacquer base coating composition was prepared:

Pigment Dispersion #1 preparation:

Add the following in order with mixing:

| | |
|---|---|
| Highly Branched Copolyester Polyol* | 58.68 |
| Methyl Amyl ketone | 138.38 |
| Add slowly with mixing at high speed (approximately 5000 RPM) on a lab top high speed disperser using a blade with a diameter of approximately 6 cm. | |
| Rheology control agent | 17.5 |
| Structure X (16.8% in NMP With 3% LiCl) | |
| Mix at high speed (approximately 5000 RPM) on a lab top high speed disperser, using a blade with a diameter of approximately 6 cm, for 30 minutes | |

*Same composition as Solution 5 of WO 03/070843 but made in methyl amyl ketone as the solvent vs. propylene glycol monomethyl ether acetate Base coating composition preparation:
Solvent Blend A

| Component | Grams |
|---|---|
| Acetone | 162 |
| Isobutyl alcohol | 234 |
| Isopropanol | 180 |
| Methyl isobutyl ketone | 108 |
| Aliphatic hydrocarbon (bp = 90-110 C.) | 270 |
| Xylene | 216 |
| Aromatic hydrocarbon (bp = 150-190 C.) | 18 |
| Total | 1188 |

Solvent Blend B

| Component | Grams |
|---|---|
| Butyl acetate | 7964.60 |
| Methyl amyl ketone | 3413.40 |
| Total | 11378.00 |

A CAB Solution, shown below, was produced by slowly adding cellulose acetate butyrate to solvent while mixing on an air mixer:

| Component | Description | Grams |
|---|---|---|
| Solvent Blend B | Solvent Blend | 5055.57 |
| CAB-381-2** | cellulose acetate butyrate | 669.12 |
| CAB-531-1** | cellulose acetate butyrate | 223.04 |
| | Total | 5947.73 |

**Supplied by Eastman Chemical Co., Kingsport, Tennessee.

| Silver Metallic Tinting Composition | Grams |
|---|---|
| Acrylic resin*** | 46.02 |
| Sparkle Silver 5745 Aluminum Paste from Silberline | 25.47 |
| Solvent blend A | 24.91 |
| Total | 96.4 |

***A random acrylic copolymer Sty/IBOMA/EHA/HEMA/BMA/MMA (10/10/15/30/10/25% by weight) at 66.40% wt solids in n-butyl acetate was prepared with the standard free radical polymerization procedure. (Sty—styrene, IBOMA—isobutyl methacrylate, EHA—2-ethyl hexyl acrylate, HEMA—hydroxy ethyl methacrylate, BMA—butyl methacrylate, MMA—methyl methacrylate)

A lacquer base coating composition was made by adding the components listed in Table 4 in the order shown and mixed using an air mixer:

TABLE 4

| Component | Parts by Weight |
|---|---|
| Pigment Dispersion #1 (prepared above) | 214.56 |
| Graft acrylic copolymer prepared in accordance with the procedure described in Example #6 of U.S. Pat. No. 6,472,463 but using methyl toluene sulfonate versus benzyl chloride | 2.82 |
| Acrylic resin (described above) | 9.20 |
| Graft copolymer (Example #1 of U.S. Ser. No. _____ Docket No. FA1127) | 79.70 |
| CAB solution (prepared above) | 152.78 |
| Silver Metallic Tinting Composition (prepared above) | 96.40 |
| Solvent Blend A (prepared above) | 244.54 |
| Total | 800.00 |

Panel Preparation

The silver basecoats were sprayed per the application instructions used for DuPont ChromaPremier® Basecoat specified in the DuPont ChromaSystem® Tech Manual. The basecoats were sprayed to hiding over ACT APR10288 cold rolled steel panels which were wiped with DuPont First Klean® 3900S sanded with 80 grit sand paper, wiped again with DuPont First Klean® 3900S, then primed with DuPont Variprime® 615S/625S Self-Etching Primer as per the instructions in the DuPont ChromaSystem® Tech Manual. The basecoats were clearcoated with DuPont ChromaClear® V-7500S Multi-Use as per the instructions in the DuPont ChromaSystem® Tech Manual. Basecoat/clearcoat panels were flashed and then baked in a 140° F. oven for 30 minutes. Topcoated panels were allowed to air dry for an additional 7 days prior to testing.

Below are the color readings recorded by a DuPont ChromaVision Custom Color MA 100B meter manufactured by X-Rite, Inc. of Grandville, Mich.:

Test Results

Below in Table 5 are the Head-on-Brightness (HOB) and flop values for this base coating composition:

TABLE 5

| Base Coating Composition | Near spec Lightness HOB | Flop |
|---|---|---|
| Prepared above | 121.9 | 6.32 |

This data shows that the use of the rheology control agent of this invention gave exception flake control in a refinish lacquer basecoat. This coating contains 2% on binder of the rheology control agent. This level of rheology control agent is much lower than the typical level of traditional rheology control agents such as wax which are used at around 10% on binder in these types of coatings. Thus the rheology control agents of this invention give excellent coating appearance at m.

The invention claimed is:

1. A rheology control agent for coating compositions, comprising: a compound having the Formula (I) including isomers or mixtures of isomers thereof:

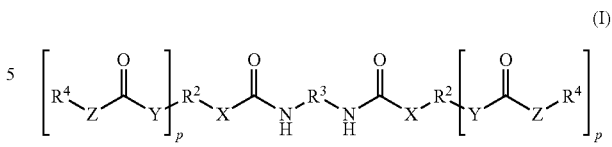

wherein p is 1 and $R^2$ is a C1 to C8 linear or branched alkylene group, a $-(CH_2CH_2-O)_n-CH_2CH_2-$ group with n being 1 to 4, $R^3$ is a C3 to C16 linear or branched alkylene group, a C1 to C6 linear or branched alkylene group bearing a C5-C16 cycloaliphatic group, a C5-C16 cycloaliphatic or alkyl substituted cycloaliphatic group; $R^4$ independently is a C4 to C16 linear or branched alkyl group; a C5 to C12 cycloaliphatic group; a C6 to C16 cycloaliphatic group bearing a linear or branched C1 to C8 alkyl group; a $-(CH_2CH_2-O)_n-CH_3$ group with n being independently 1 to 8; and X and Y are chosen from O or NH with the proviso that if X is O, Y cannot be O and if X is NH, Y cannot be NH, Y may be nothing, Z is chosen from O, NH, or nothing.

2. A rheology control agent for coating compositions according to Formula (V)

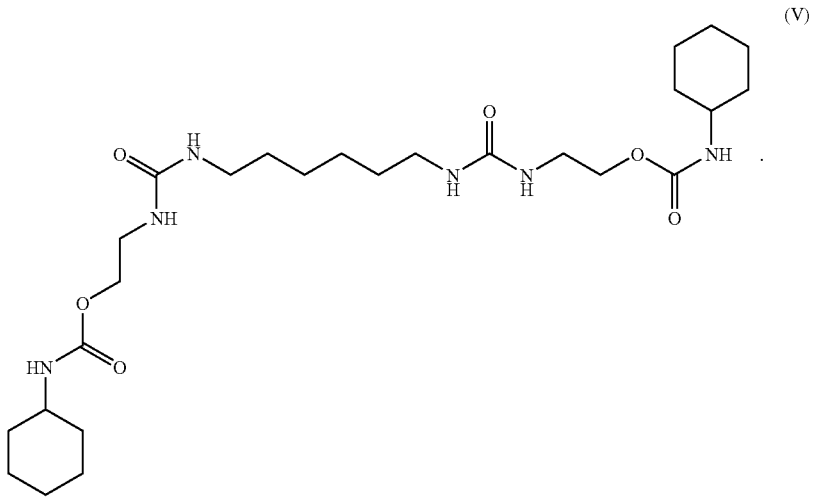

3. A solvent-borne coating composition comprising a binder of a film forming polymer and the rheology control agent of claim 1.

4. The solvent-borne coating composition of claim 3 comprising 5 to 95 percent by weight of an organic solvent, based on the weight of the coating composition and 5 to 95 percent by weight, based on the weight of the coating composition of film forming binder and 0.01 to 30 percent by weight, based on the weight of the binder, of the rheology control agent.

5. The solvent-borne coating composition of claim 4 containing pigment.

6. The solvent-borne coating composition of claim 4 wherein the film forming polymer comprises linear poly (meth)acrylates, branched, grafted or segmented poly(meth) acrylates, polyesters, branched copolyesters, oligomers, urethane oligomers, polyesterurethanes, polyepoxides, carbamate functional polymers or any mixtures thereof.

7. The solvent-borne coating composition of claim 6 containing a crosslinking agent selected from the group of a polyisocyanate, an alkylated melamine, polyepoxide and any mixtures thereof.

8. The solvent-borne coating composition of claim 4 containing 0.1 to 10 percent by weight, based on the weight of the binder, of the rheology control agent.

9. The solvent-borne coating composition of claim 4 containing finely divided silica in a weight ratio of rheology control agent to silica of 0.1:1.0 to 1.0:0.1.

10. A substrate coated with at least one dried layer of the composition of claim 3.

11. An automotive body coated with at least one dried layer of the composition of claim 3.

* * * * *

UNITED STATES PATENT AND TRADEMARK OFFICE
CERTIFICATE OF CORRECTION

PATENT NO. : 7,632,882 B2 Page 1 of 1
APPLICATION NO. : 11/330933
DATED : December 15, 2009
INVENTOR(S) : Lenges et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 694 days.

Signed and Sealed this

Second Day of November, 2010

David J. Kappos
*Director of the United States Patent and Trademark Office*